US012683296B2

(12) United States Patent
McGough

(10) Patent No.: US 12,683,296 B2
(45) Date of Patent: Jul. 14, 2026

(54) VERTICALLY-POLARIZED OMNIDIRECTIONAL ANTENNA WITH BROADBAND AMPLITUDE TAPER

(71) Applicant: PCTEL, Inc., Bloomingdale, IL (US)

(72) Inventor: Erin Patrick McGough, Seven Hills, OH (US)

(73) Assignee: PCTEL, INC., Bloomingdale, IL (US)

( * ) Notice: Subject to any disclaimer, the term of this patent is extended or adjusted under 35 U.S.C. 154(b) by 190 days.

(21) Appl. No.: 18/761,851

(22) Filed: Jul. 2, 2024

(65) Prior Publication Data

US 2026/0011931 A1 Jan. 8, 2026

(51) Int. Cl.
*H01Q 21/29* (2006.01)
*H01Q 1/42* (2006.01)
(Continued)

(52) U.S. Cl.
CPC ............... *H01Q 21/29* (2013.01); *H01Q 1/42* (2013.01); *H01Q 1/50* (2013.01); *H01Q 9/20* (2013.01); *H01Q 13/10* (2013.01)

(58) Field of Classification Search
CPC ............ H01Q 21/29; H01Q 1/42; H01Q 1/50; H01Q 9/20; H01Q 13/10
See application file for complete search history.

(56) References Cited

U.S. PATENT DOCUMENTS

| | | | | |
|---|---|---|---|---|
| 4,095,229 A * | 6/1978 | Elliott | H01Q 5/321 455/142 |
| 2006/0082515 A1* | 4/2006 | Petropoulos | H01Q 1/241 343/797 |

(Continued)

FOREIGN PATENT DOCUMENTS

| | | | |
|---|---|---|---|
| CN | 106505311 A * | 3/2017 | H01Q 21/0006 |
| CN | 115036699 A * | 9/2022 | H01Q 1/36 |
| KR | 20090125435 A * | 12/2009 | H01Q 1/2291 |

OTHER PUBLICATIONS

J. P. Doane, K. Sertel and J. L. Volakis, "A Wideband, Wide Scanning Tightly Coupled Dipole Array With Integrated Balun (TCDA-IB)," in IEEE Transactions on Antennas and Propagation, vol. 61, No. 9, pp. 4538-4548, Sep. 2013, doi: 10.1109/TAP.2013.2267199. (Year: 2013).*

(Continued)

*Primary Examiner* — Regis J Betsch
*Assistant Examiner* — Jose A. Miranda Gonzalez
(74) *Attorney, Agent, or Firm* — Husch Blackwell LLP

(57) ABSTRACT

A vertically-polarized omnidirectional antenna, including: a body including: a host printed circuit board (PCB) including: first and second slots, and a metal flooded ground plane, first and second antenna PCBs forming four dipole pairs, the first and second antenna PCBs mounted to the host PCB, respective first to third ground connection fillet tabs, the first and second tabs being on an opposite side of the host PCB from the third tab, the first to third tabs being on a same side of its antenna PCB, an amplitude taper on each antenna PCB at transitions between the host and antenna PCBs, including: a first transmission line splitting off into a second transmission line and a third transmission line, the second transmission line feeding two antennas to form one dipole pair, the third transmission line stepping down using a quarter-wave transformer, and a radio frequency (RF) connector to receive a power supply.

19 Claims, 29 Drawing Sheets

(51) Int. Cl.

*H01Q 1/50* (2006.01)
*H01Q 9/20* (2006.01)
*H01Q 13/10* (2006.01)

(56) References Cited

U.S. PATENT DOCUMENTS

| | | | | |
|---|---|---|---|---|
| 2016/0174364 | A1* | 6/2016 | Harkness, Jr. ......... | H05K 1/115 174/262 |
| 2017/0365911 | A1* | 12/2017 | Zachara ................. | H01Q 21/28 |
| 2022/0115774 | A1* | 4/2022 | Potens ................... | H01Q 5/342 |
| 2023/0106893 | A1* | 4/2023 | Saveri .................... | H01Q 21/10 343/702 |

OTHER PUBLICATIONS

G.-L. Huang, S.-G. Zhou, T.-H. Chio, H.-T. Hui and T.-S. Yeo, "A Low Profile and Low Sidelobe Wideband Slot Antenna Array Feb by an Amplitude-Tapering Waveguide Feed-Network," in IEEE Transactions on Antennas and Propagation, vol. 63, No. 1, pp. 419-423, Jan. 2015 (Year: 2015).*

"Phased_array_antennas: MATLAB simulation scripts which theoretically demonstrate the versatility of Phased-Array Antennas with beam steering and shaping capabilities" 2020 by Sergio Mendez Vargo (Year: 2020).*

W. Zhou, Y. Chen and S. Yang, "A 12.5:1 Bandwidth Dual-Polarized Tightly Coupled Dipole Phased Array with Compact Balun," 2018 IEEE International Symposium on Antennas and Propagation & USNC/URSI National Radio Science Meeting, Boston, MA, USA, 2018, pp. 2163-2164 (Year: 2018).*

Zhou, W. et al, "A 12.5:1 Bandwidth Dual-Polarized Tightly Coupled Dipole Phased Array with Compact Balun," 2018 IEEE International Symposium on Antennas and Propagation & USNC/URSI National Radio Science Meeting, Boston, MA, USA, 2018, pp. 2163-2164, doi: 10.1109/APUSNCURSINRSM.2018.8608204.

Wang, H. et al, "A Compact Single Layer Monopulse Microstrip Antenna Array," IEEE Transactions on Antennas and Propagation, vol. 54, No. 2, pp. 503-509, Feb. 2006, doi: 10.1109/TAP.2005.863103.

Huang, G.L. et al, "A Low Profile and Low Sidelobe Wideband Slot Antenna Array Feb by an Amplitude-Tapering Waveguide Feed-Network," IEEE Transactions on Antennas and Propagation, vol. 63, No. 1, pp. 419-423, Jan. 2015, doi: 10.1109/TAP.2014.2365238.

Doane, J.P. et al, "A Wideband, Wide Scanning Tightly Coupled Dipole Array With Integrated Balun (TCDA-IB)," IEEE Transactions on Antennas and Propagation, vol. 61, No. 9, pp. 4538-4548, Sep. 2013, doi: 10.1109/TAP.2013.2267199.

Singh, B. "Compact Planar Antenna Array With Tapering in Both Planes for Desired First Sidelobe Reduction," IEEE Antennas and Wireless Propagation Letters, vol. 18, No. 3, pp. 531-535, Mar. 2019, doi: 10.1109/LAWP.2019.2896114.

Trifunovic, V. et al, "Review of printed Marchand and double Y baluns: characteristics and application," IEEE Transactions on Microwave Theory and Techniques, vol. 42, No. 8, pp. 1454-1462, Aug. 1994, doi: 10.1109/22.297806.

* cited by examiner

VERTICALLY-POLARIZED OMNIDIRECTIONAL ANTENNA WITH BROADBAND AMPLITUDE TAPER

TECHNICAL FIELD

This disclosure generally relates to an antenna. More particularly, this disclosure relates to a vertically-polarized omnidirectional antenna with broadband amplitude taper, and even more particularly, a vertically-polarized omnidirectional antenna with broadband amplitude taper for applications requiring high sidelobe suppression.

BACKGROUND

In the information age, broadband spectrum radio frequency (RF) transmission is increasingly important. However, power levels output by antennas at various radio bands can interfere with government-regulated parts of the radio frequency spectrum. In the United States, to protect incumbent services that operate in the 6 GHz band from interference, the Federal Communications Commission (FCC) has mandated that all standard power access points operating outdoors over Unlicensed National Information Infrastructure (U-NII) band 5 (U-NII-5) at 5.925-6.425 GHz and band 7 (U-NII-7) at 6.525-6.875 must not exceed 21 dBm effective isotropic radiated power (EIRP), which is the realized gain of the antenna (dBi) plus the power (dBm) supplied to the antenna, at all points in space that are greater than or equal to 30° above the horizon. This imposes a constraint on the antenna design; specifically, that the skyward radiation level must be low enough so that, in combination with the conducted output power and correlated gain, the EIRP limit is satisfied. Conventional solutions do not adequately suppress the radiation in both ≥30° skyward regions to at most −15 dB below the peak gain of the antenna. Also, conventional solutions are oftentimes not omnidirectional in the azimuth plane of the antenna and do not have sufficient operational bandwidth and are, therefore, not "broadband" antennas.

Thus, there is a need for a vertically-polarized omnidirectional antenna with broadband amplitude taper for applications requiring high sidelobe suppression.

BRIEF SUMMARY

As described above, conventional antennas do not adequately suppress the radiation in both ≥30° skyward regions to at most −15 dB below the peak gain of the antenna. Also, conventional antennas are oftentimes not omnidirectional in the azimuth plane of the antenna and do not have sufficient operational bandwidth and are, therefore, not "broadband" antennas.

This disclosure pertains to a vertically-polarized omnidirectional antenna with broadband amplitude taper. An advantage of the vertically-polarized omnidirectional antenna with broadband amplitude taper is that is provides high sidelobe suppression and thereby improves the antenna performance compared to a conventional antenna.

A first aspect of this disclosure pertains to a vertically-polarized omnidirectional antenna, including: a body including: a host printed circuit board (PCB) including: a first slot and a second slot, and a metal flooded ground plane, a first antenna PCB and a second antenna PCB forming an array of four dipole pairs, each of the first antenna PCB and the second antenna PCB including two of the four dipole pairs, the first antenna PCB being mounted to the host PCB through the first slot, the second antenna PCB being mounted to the host PCB through the second slot, respective first, second, and third ground connection fillet tabs, connected to the metal flooded ground plane of the host PCB and to a respective antenna PCB among the first and second antenna PCBs, at a transition between the host PCB and the respective antenna PCB, the first and second ground connection fillet tabs being on a first side of the host PCB, and the third ground connection fillet tab being on a second side of the host PCB opposite to the first side of the host PCB, the first, second, and third ground connection fillet tabs being on a same side of the respective antenna PCB, a respective amplitude taper on each antenna PCB at the transition between the host PCB and each respective antenna PCB, each amplitude taper including: a first transmission line connected to the respective antenna PCB, the first transmission line having a characteristic impedance of $Z_0-\Delta$, where $\Delta$ is between 0 and $0.2*Z_0$, the first transmission line splitting off into a second line having a characteristic impedance of $Z_0$ and a third transmission line having a characteristic impedance of at least $2*Z_0$, the second transmission line being routed toward a center of the array on the first and second antenna PCBs and feeding two antennas, each having an input impedance of $2*Z_0$, to form one dipole pair among the four dipole pairs, the third transmission line stepping into the impedance of the second transmission line using a quarter-wave transformer or a or multi-section transformer to feed a dipole pair at the edge of the array, and a radio frequency (RF) connector coupled to one end of the body (or housing) to enable signal transmission and reception between the radio and antenna.

A second aspect of this disclosure pertains to the antenna of the first aspect, wherein the body further includes a radome covering the two antenna PCBs and the host PCB.

A third aspect of this disclosure pertains to the antenna of the first aspect, wherein the third transmission line has a high characteristic impedance and includes an 8 mil trace coated with solder mask.

A fourth aspect of this disclosure pertains to the antenna of the first aspect, wherein two center dipole pairs among the four dipole pairs receive more power than two outer dipole pairs among the four dipole pairs.

A fifth aspect of this disclosure pertains to the antenna of the first aspect, wherein the first slot and the second slot, when operated as radiators, have low input impedance at a transition between the host PCB and each respective antenna PCB.

A sixth aspect of this disclosure pertains to the antenna of the first aspect, wherein: the metal of the host PCB reflects energy radiated by each dipole of the dipole pairs, and array radiation of each dipole pair balances radiation reflected by the host PCB to produce an omnidirectional radiation pattern.

A seventh aspect of this disclosure pertains to the antenna of the first aspect, wherein each dipole is fed with a Marchand balun.

An eighth aspect of this disclosure pertains to the antenna of the first aspect, wherein the metal flooded ground plane is realized using copper vias.

A ninth aspect of this disclosure pertains to the antenna of the first aspect, wherein the antenna is configured to operate in a band of about 4.9-6.9 GHz.

A tenth aspect of this disclosure pertains to the antenna of the first aspect, wherein: the first transmission line has an impedance of about 45Ω, the second transmission line has an impedance of about 50Ω, the third transmission line has an impedance of about 125Ω, and each antenna in each dipole pair has an impedance of about 100Ω.

An eleventh aspect of this disclosure pertains to a method, including: energizing a vertically-polarized antenna fed by a coaxial cable that is driven by a radio frequency (RF) signal, dividing power in the RF signal among each of a plurality of dipole antenna pairs via a respective amplitude taper, each amplitude taper including a first transmission line connected to the respective antenna PCB, the first transmission line having a characteristic impedance of $Z_0-\Delta$, where Δ is between 0 and $0.2*Z_0$, the first transmission line splitting off into a second line having a characteristic impedance of $Z_0$ and a third transmission line having a characteristic impedance of at least $2*Z_0$, the second transmission line being routed toward a center of the array on the first and second antenna PCBs and feeding two antennas, each having an input impedance of $2*Z_0$, to form one dipole pair among the four dipole pairs, the third transmission line stepping into the impedance of the second transmission line using a quarter-wave transformer or a or multi-section transformer to feed a dipole pair at the edge of the array, and generating a highly omnidirectional RF radiation pattern having <−15 dB sidelobe level at all points in space ≥30° above a horizon over an operational frequency bandwidth.

A twelfth aspect of this disclosure pertains to the method of the eleventh aspect, wherein the 125Ω line includes an 8 mil trace coated with a solder mask to mechanically strengthen the trace.

A thirteenth aspect of this disclosure pertains to the method of the eleventh aspect, wherein two center dipole pairs among the plurality of dipole pairs receive more power than two outer dipole pairs among the plurality of dipole pairs.

A fourteenth aspect of this disclosure pertains to the method of the eleventh aspect, wherein the metal of a host PCB, into which each antenna PCB is inserted, reflects energy radiated by each dipole of the dipole pairs.

A fifteenth aspect of this disclosure pertains to the method of the fourteenth aspect, wherein the first slot and the second slot have low input impedance, when viewed as an antenna, at the design center frequency, at the transition between the host PCB and each respective antenna PCB.

A sixteenth aspect of this disclosure pertains to the method of the eleventh aspect, wherein each dipole is fed with a 100 Ω input impedance Marchand balun and matched with a stub of normalized input susceptance b=0.4.

A seventeenth aspect of this disclosure pertains to the method of the eleventh aspect, wherein the antenna is configured to operate in a frequency band of about 4.9-6.9 GHz.

An eighteenth aspect of this disclosure pertains to the method of the seventeenth aspect, wherein the amplitude taper suppresses the radiation in both ≥30° skyward regions to at most −15 dB below the peak gain of the antenna.

A nineteenth aspect of this disclosure pertains to the method of the eleventh aspect, wherein: the first transmission line has an impedance of about 45Ω, the second transmission line has an impedance of about 50Ω, the third transmission line has an impedance of about 125Ω, and each antenna in each dipole pair has an impedance of about 100Ω.

Figure 1:
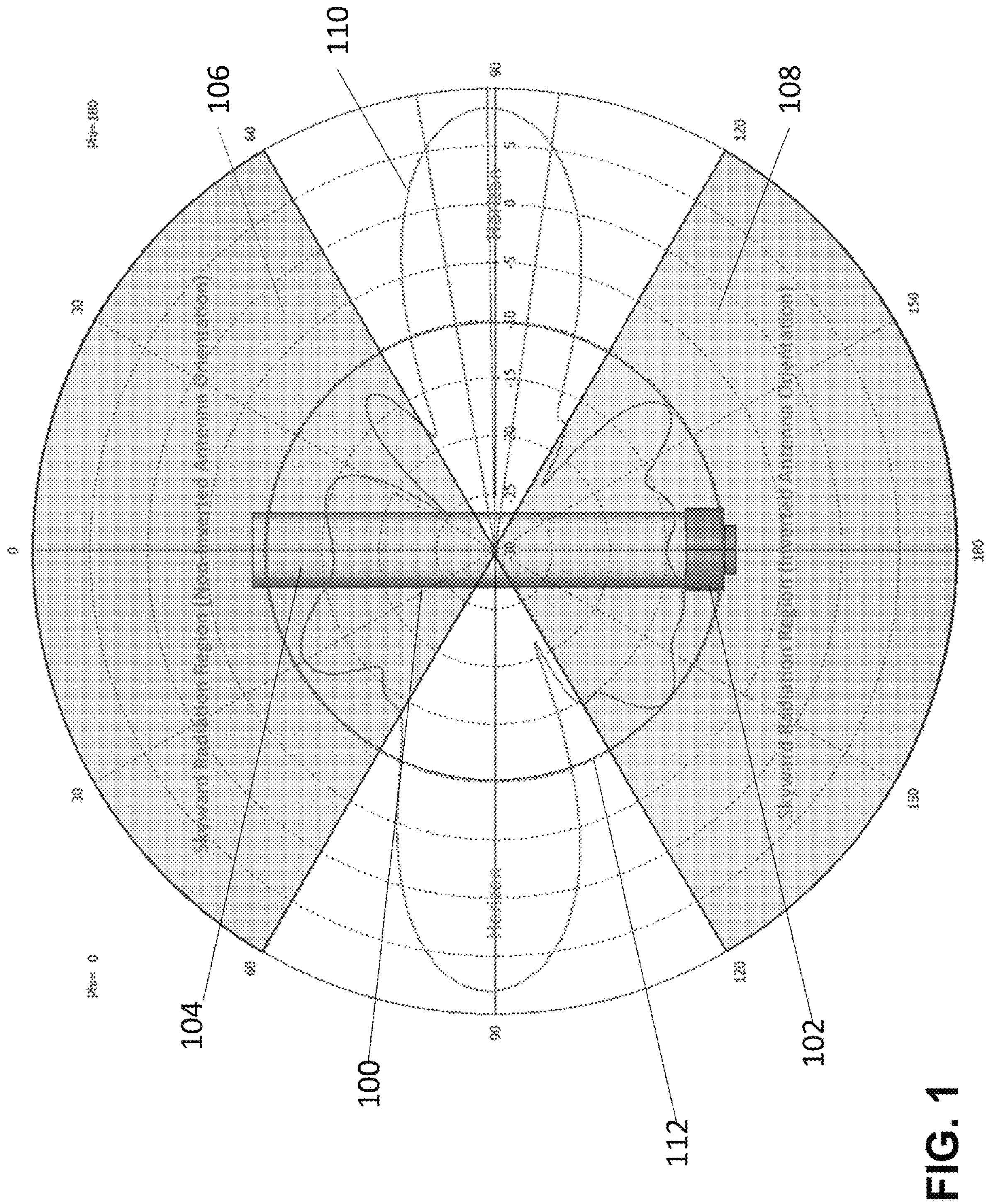
FIG. 1 illustrates a chart of a radiation pattern of an antenna in ≥30° skyward regions.

Before explaining the disclosed embodiment of this disclosure in detail, it is to be understood that the invention is not limited in its application to the details of the particular arrangement shown, as the invention is capable of other embodiments. Example embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

While subject disclosure is susceptible of embodiments in many different forms, there are shown in the drawings and will be described in detail herein specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in any desired combinations, for the operation of the invention in its various embodiments. Features from one embodiment can be used in other embodiments of the invention.

FIG. 1 illustrates a radiation pattern of an antenna in the ≥30° skyward regions.

An antenna 100 may be provided in a non-inverted orientation or in an inverted orientation. The antenna 100 illustrated in FIG. 1 is shown in a non-inverted orientation, and includes a connector 102 at one end that is illustrated as pointing down from a horizontal plane, e.g., directed toward the ground, with a body 104 of the antenna 100 that is illustrated as being pointed skyward. There are two ways an antenna 100 can be mounted, e.g., to achieve omnidirectional coverage in the plane around the antenna: (1) right-side-up or (2) inverted. The regions restricted by the FCC are shown in the shaded regions 106 and 108 of FIG. 1. Embodiments may suppress radiation directed to both regions. The line 110 of FIG. 1 shows a radiation pattern for an antenna 100 according to an embodiment in which the gain near the horizon (90°) is high, increased, or maximized, while skyward radiation at 0° or 180° (depending on non-inverted or inverted orientations) has a gain at or below −10 dB, shown by line 112. It should be noted that FIG. 1 illustrates a single elevation plane slice; the antenna 100 (or antennas) and radio transmitter should satisfy the EIRP limit for all elevation plane cuts.

While the antenna 100 may cover the U-NII-5 band and the U-NII-7 band as described above, an operational bandwidth of the antenna 100 may also cover the 4.9 GHz public safety band and/or the 5 GHz U-NII-1 band at 5.150-5.250 GHz, which also must satisfy the FCC's 21 dBm EIRP requirement, without increasing the size of the antenna 100. Therefore, potentially, one antenna may cover the 5 GHz and 6 GHz bands. It is also possible to reduce the frequency range of the antenna 100 to cover only 5 GHz or 6 GHz bands. In embodiments, the coverage of the antenna 100 may be for example, 4.9-6.9 GHz, or for example, 5.15-5.875 GHz and/or 5.925-6.875 GHz.

The antenna 100 is a vertically-polarized, omnidirectional antenna that utilizes a broadband, tapered amplitude distribution to limit the radiation in unwanted directions to, for example, at most −15 dB below the peak gain of the antenna. The antenna 100 may also have at least, for example, 6 dBi of realized gain, good efficiency (e.g., >75%), and highly omnidirectional radiation patterns (e.g., less than 3 dB of ripple in the azimuth plane). It is desirable that these specifications be met over the full operational bandwidth.

FIGS. 2-10 show various views of the configuration of the antenna 100 according to an embodiment. The antenna 100 according to an embodiment includes the connector 102 of FIG. 1, and a radome 202, two antenna printed circuit boards (PCBs) 302 and 304, and a host PCB 402 as the body 104 of FIG. 1.

Figure 2:
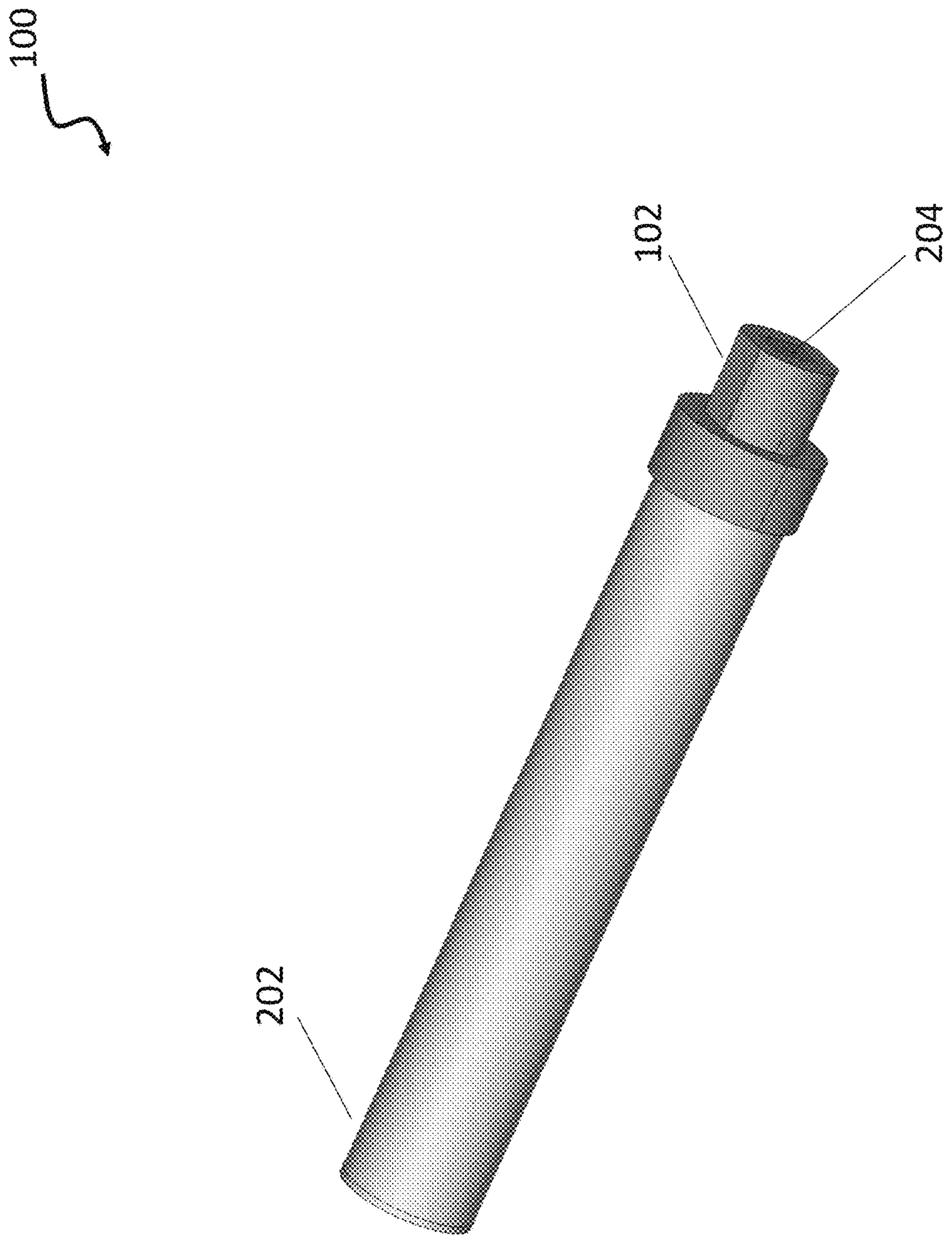
FIG. 2 is a perspective view of an antenna according to an embodiment.

FIG. 2 illustrates an outside view of the antenna 100. The antenna 100 includes the connector 102 at one end and the radome 202 on the outside of the body 104 (see FIG. 1). The connector 102 includes a port 204 for guiding RF power to and from a radio transceiver (not shown). In one example, the radome 102 may have a diameter of one inch, and the antenna 100 may have a total length of 7.48 inches, although embodiments are not limited thereto. The connector may be, for example, a coaxial connector, which may be an N-type, e.g., N-male or N-female. The radome may be made of any suitable material, for example, a polycarbonate and/or an acrylonitrile butadiene styrene (ABS) blend, that has a low enough index of refraction to be nearly transparent to enable electromagnetic transmission and reception over C band or any other desirable band. The copper features for producing the desired radiation pattern are housed inside the radome 202, as described below.

Figure 3:
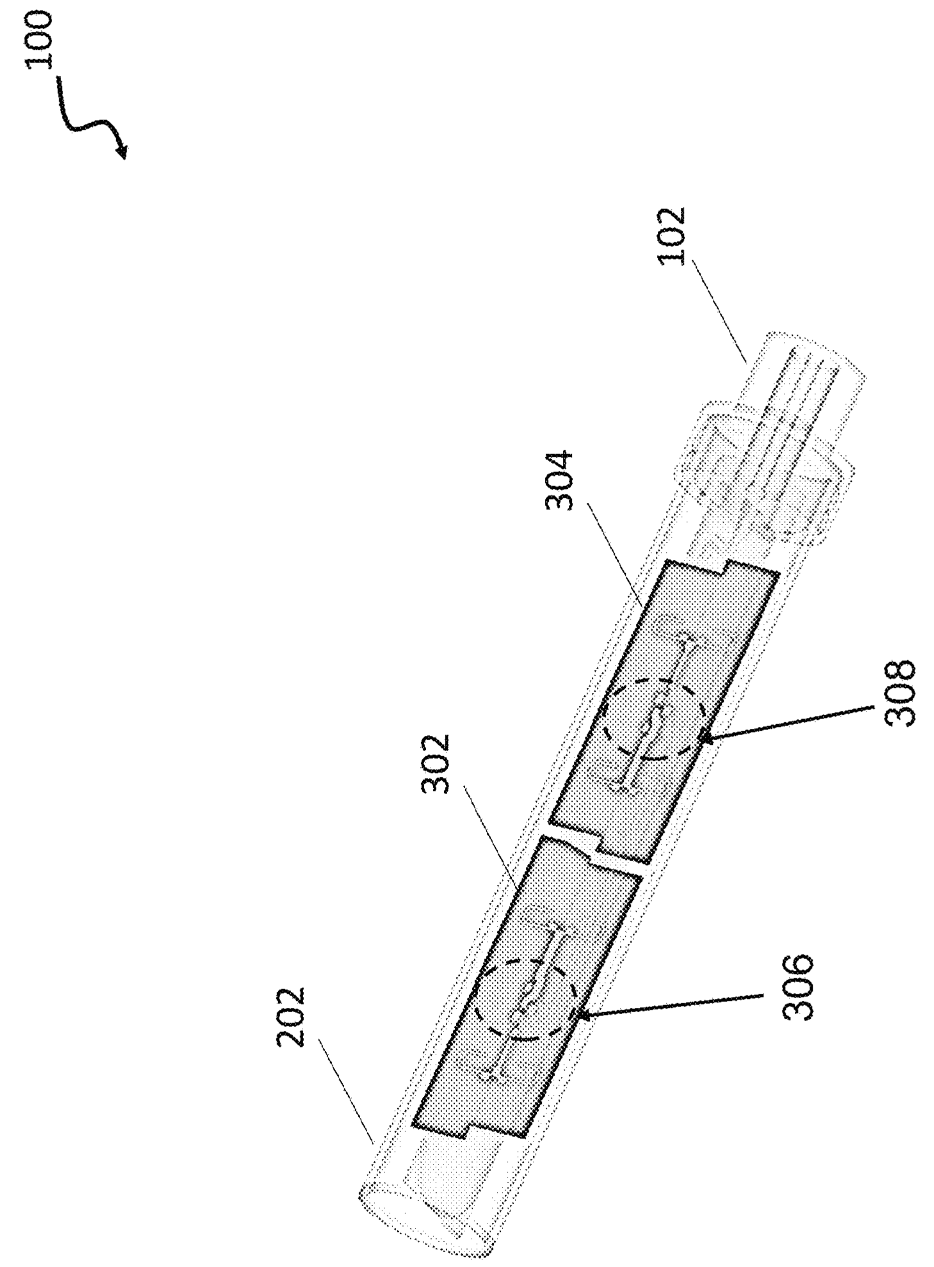
FIG. 3 is a perspective view of an antenna according to an embodiment.

FIG. 3 illustrates an internal view of the antenna 100 with the outer radome 202 and connector 102 shown as being transparent for convenience of illustration of internal features. The antenna 100 includes the antenna PCBs 302 and 304. Each of the antenna PCBs 302 and 304 includes a respective amplitude taper region 306, 308, which will be described in further detail below.

Figure 4:
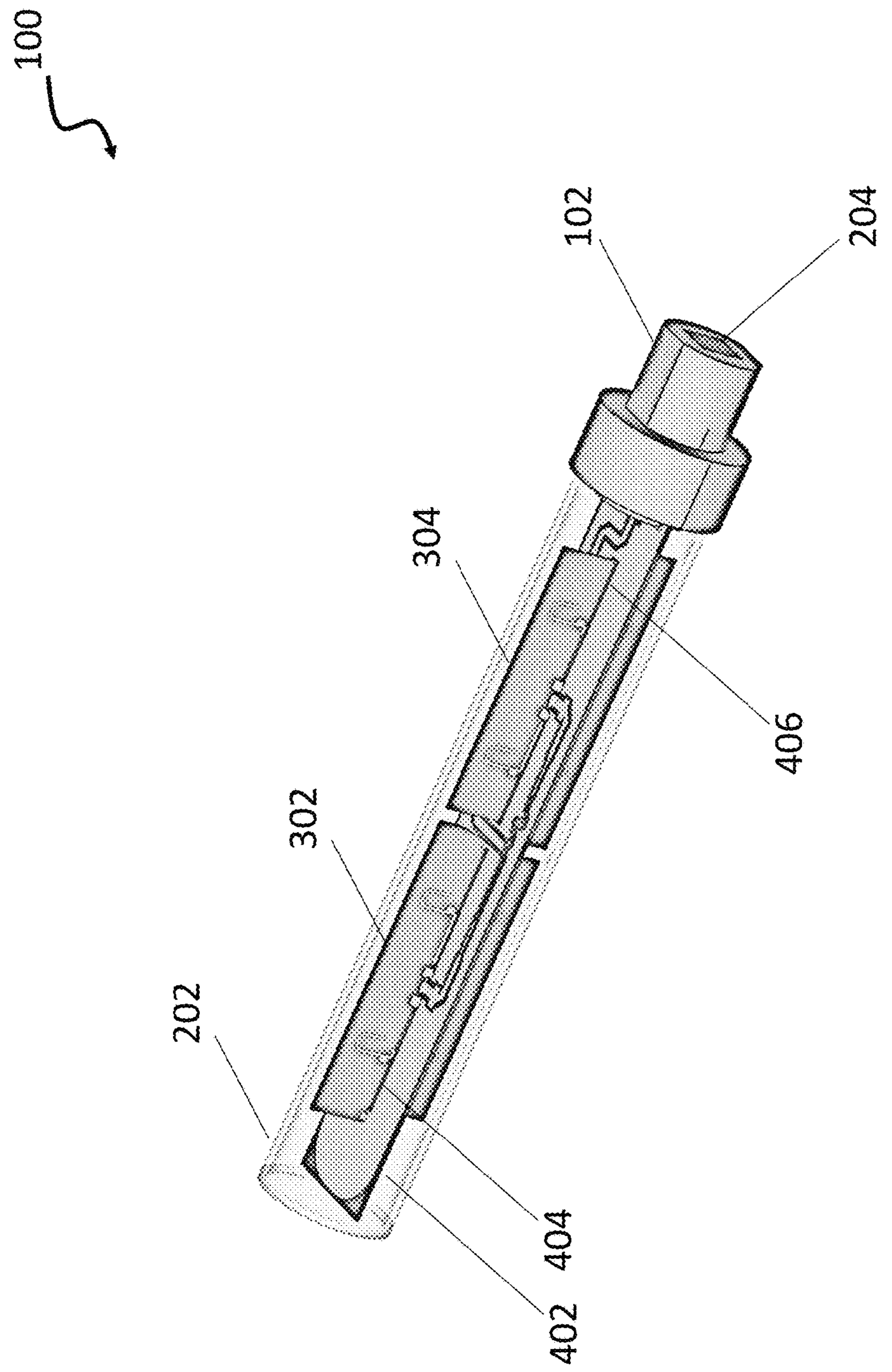
FIG. 4 is a perspective view of a model of an antenna according to an embodiment.
Figure 5:
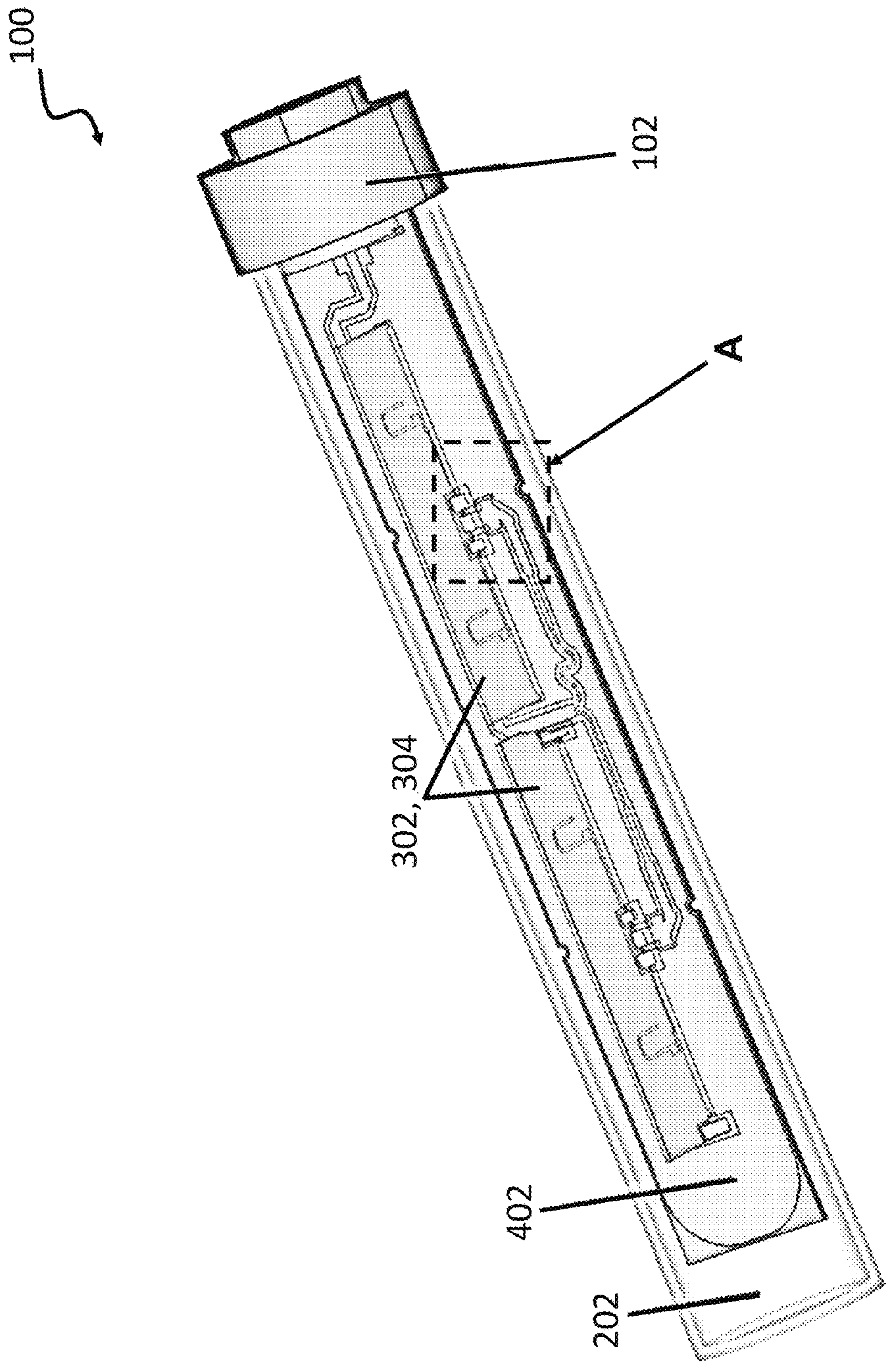
FIG. 5 is a perspective view of an antenna according to an embodiment.
Figure 6:
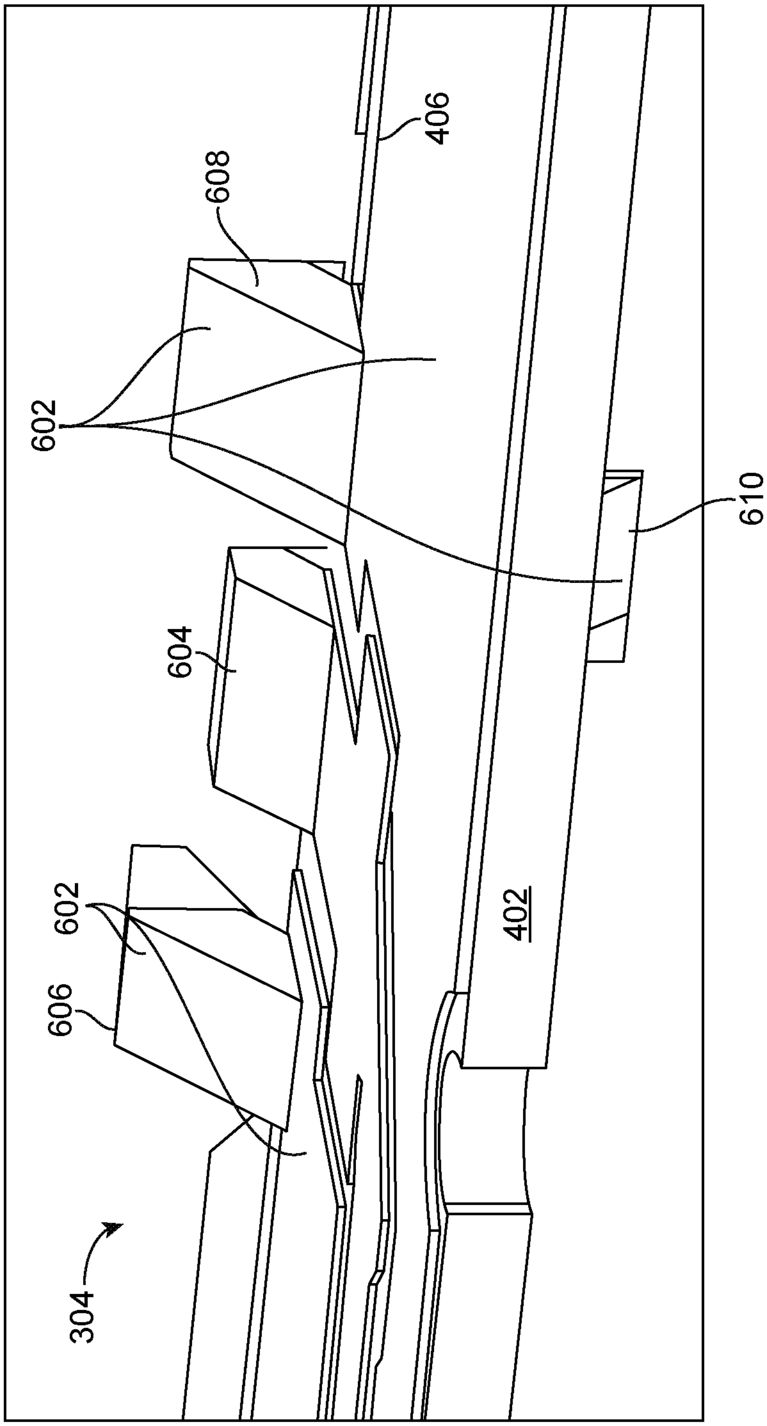
FIG. 6 is an expanded view of an area 'A' of FIG. 5.
Figure 7:
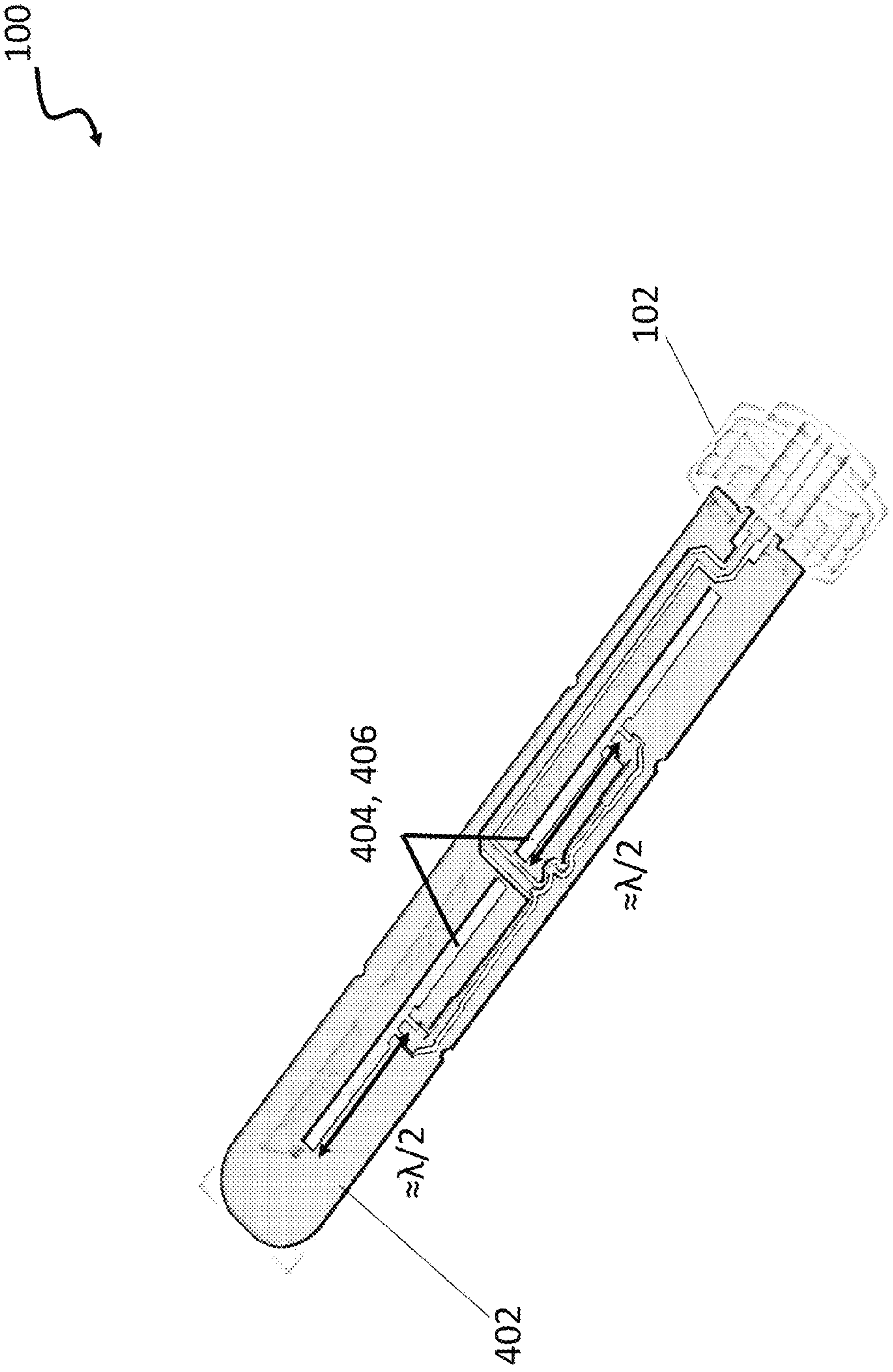
FIG. 7 is a perspective view of an antenna according to an embodiment.

FIGS. 4-5 illustrate the host PCB 402 into which the antenna PCBs 302, 304 are mounted. FIG. 6 is an expanded view of a region 'A' of FIG. 5. The antenna PCBs 302, 304 are mounted through respective slots 404, 406 in the host PCB 402. The antenna PCBs 302, 304 may be soldered to the host PCB 402 in multiple locations. Solder points at the host PCB-to-antenna PCB transition are illustrated in FIG. 6. FIG. 6 illustrates that grounds 602 and an RF signal line connection 604 are provided between the host PCB and the antenna PCBs 302, 304. There may be one solder location per board for a radio frequency (RF) signal, which may be provided as a microstrip transmission line. There may be three ground connection fillet tabs 606, 608, 610 at the transition between the host PCB and each antenna PCB. There may be two supplementary connection points, e.g., at the top and bottom of each antenna PCB 302, 304, that may be mechanical in nature. The grounding around the transition maintains impedance control and suppresses radiation from the slot (e.g., slots 404, 406) that is created by inserting the antenna PCB 302, 304 into the host PCB 402. Ground plane flooding may be performed to achieve desired performance, and may curtail a surface wave sourced by the long-running microstrip on the host PCB. The transition point between the PCBs occurs approximately one half-wavelength from the short-side short-circuit point of the slot. When viewed as a radiation mechanism, the slot has low input impedance. The three ground connection fillet tabs 606, 608, 610 control the line impedance at each host PCB and antenna PCB transition and curtail spurious radiation from the slots. Thus, the slot (e.g., slots 404, 406), when viewed as a radiator, has a low input impedance at the transition point and may be fairly easy to excite. The slots 404, 406 are depicted in FIG. 7. Outside of the transmission lines and slots, the host PCB 402 may be, for example, a solid piece of copper. Vias may tie the top and bottom layers together throughout. The copper of the host PCB 402 may be used to reflect the energy radiated by the dipole elements, which will be described in further detail below.

Figure 8:
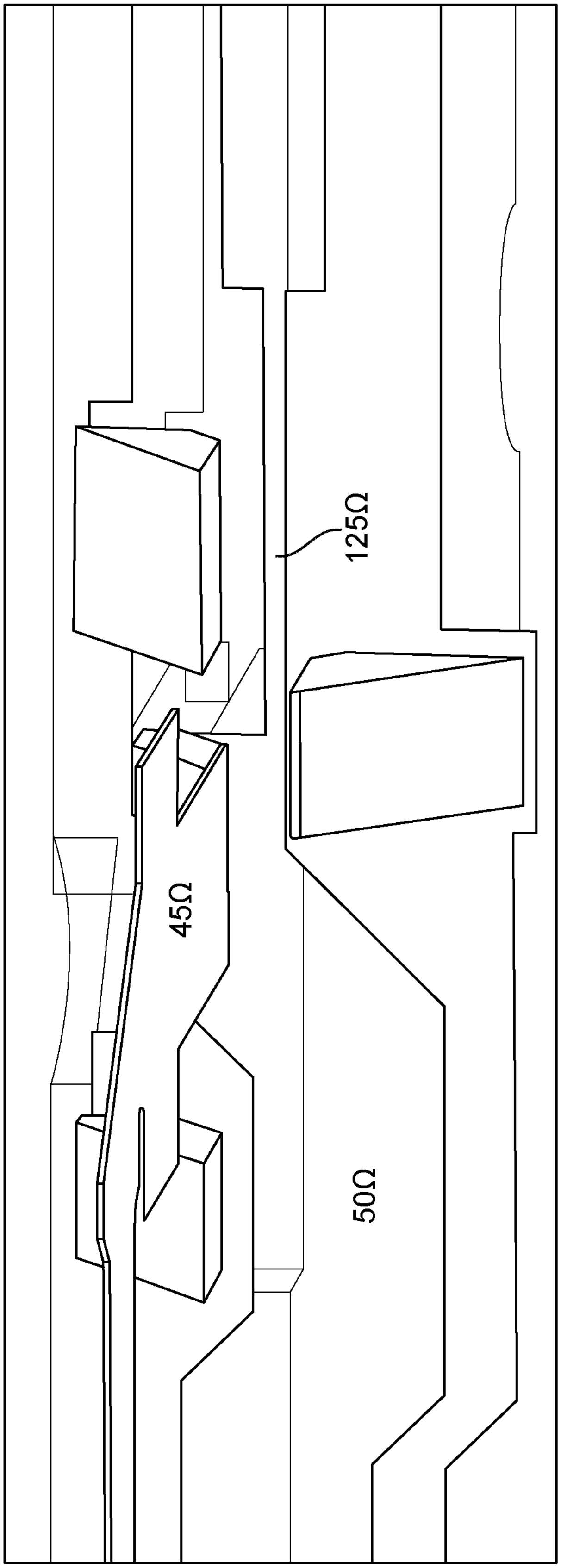
FIG. 8 is an expanded view of an area 'A' of FIG. 5.
Figure 9:
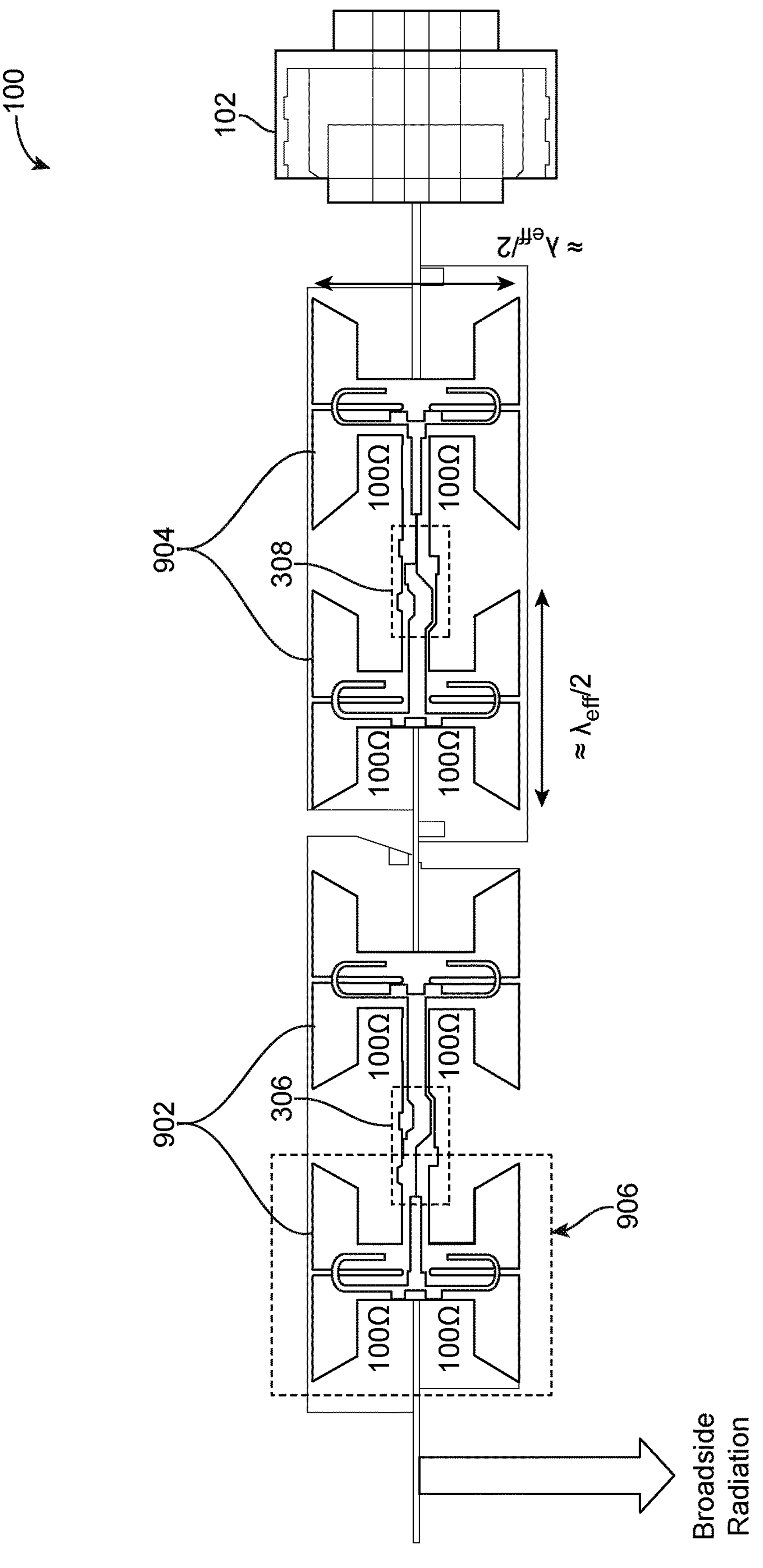
FIG. 9 is a perspective view of an antenna according to an embodiment.

The transitions from the host PCB 402 to the antenna PCBs 302, 304 are important because they are where the amplitude taper 306, 308 occur, which suppress skyward radiation. An amplitude taper is an unequal power division, and its geometry is illustrated in FIG. 8. A 45Ω line is soldered to the antenna PCBs 302, 304 and splits off into 50Ω and 125Ω lines. The 45Ω line may be a first transmission line of characteristic impedance $Z_0-\Delta$, where Δ is small and positive (e.g., between 0 and $0.2*Z_0$), connected to the respective antenna PCB and splitting off into a second transmission line of characteristic impedance $Z_0$ (e.g., 50Ω) and a third transmission line of characteristic impedance that is at least $2*Z_0$ (e.g., 125Ω), the $Z_0$ (e.g., 50Ω) second transmission line being routed toward a center of the array on the first and second PCBs and feeding two $2*Z_0$ antennas (e.g., 100Ω) to form one dipole pair among the four dipole pairs, the high impedance third transmission line (e.g., 125Ω, at least $2*Z_0$) stepping into $Z_0$ (e.g., 50Ω) using a quarter-wave transformer or a multi-section transformer to feed a dipole pair at the edge of the array. The second transmission (e.g., 125Ω) line may be fabricated, for example, from an 8 mil trace that may be coated with solder mask to protect it when the antenna PCB is inserted into the host PCB. Following the split, the 50Ω line routes toward the center of the array on both antenna PCBs and feeds two 100Ω input impedance antennas as shown in FIG. 9, which forms a pair of dipoles, e.g., dipole pair 906. There are four pairs of dipoles illustrated in FIG. 9. The 125Ω line steps into 50Ω using a quarter-wave transformer to feed the top and bottom dipole pairs. More power is supplied to the two center antennas than to the two edge antennas. The limited impedance bandwidth of the single-section transformer does not significantly affect the return loss because it runs to a tapered port.

The design of the radiation region focuses on the spacing of the dipole element off a reflector (e.g., the copper of the host PCB 402). Use of a reflector directs energy to the broadside direction. The placement of the dipole off the reflector affects the directivity in the broadside direction (e.g., the direction normal to the host PCB) but also affects the directivity of the 2×1 dipole pair in the direction perpendicular to the broadside direction (see FIG. 9). In FIG. 9, the directions perpendicular to broadside are depicted as being in and out of the page. Each dipole pair produces peak radiation in a direction out of the page. Optimizing the spacing of the dipole pairs 902, 904 off PCB 402 means equalizing the directivity in the broadside and perpendicular-to-broadside directions. Therefore, there may be four peaks in the radiation pattern. An example spacing of the dipole pairs from one another is about 3λ/8 at the design center frequency. The design of the taper, e.g., to achieve a target sidelobe level (SLL), depends on the vertical spacing of the dipole elements. In general, less tapering may be needed for closely-spaced antennas, but the tighter the spacing the lower the gain and the wider the beamwidth at the lowest frequency of operation. Omnidirectional radiation may be accomplished by balancing the two radiation modes.

Each dipole may be fed with a 100Ω input impedance Marchand balun and matched with a stub of normalized susceptance b=0.4. Full simulated and measured experimental datasets are shown in FIGS. 13-29. The peak skyward radiation in the upper and lower hemispheres is less than −15 dBic (down from the peak gain) over the U-NII-5 and U-NII-7 bands and −13 dBic over the U-NII-1 band. The beamwidth of the main beam limits the suppression in this case and is a consequence of the close spacing of the array elements to achieve excellent performance over the 6 GHz band.

Figure 10:
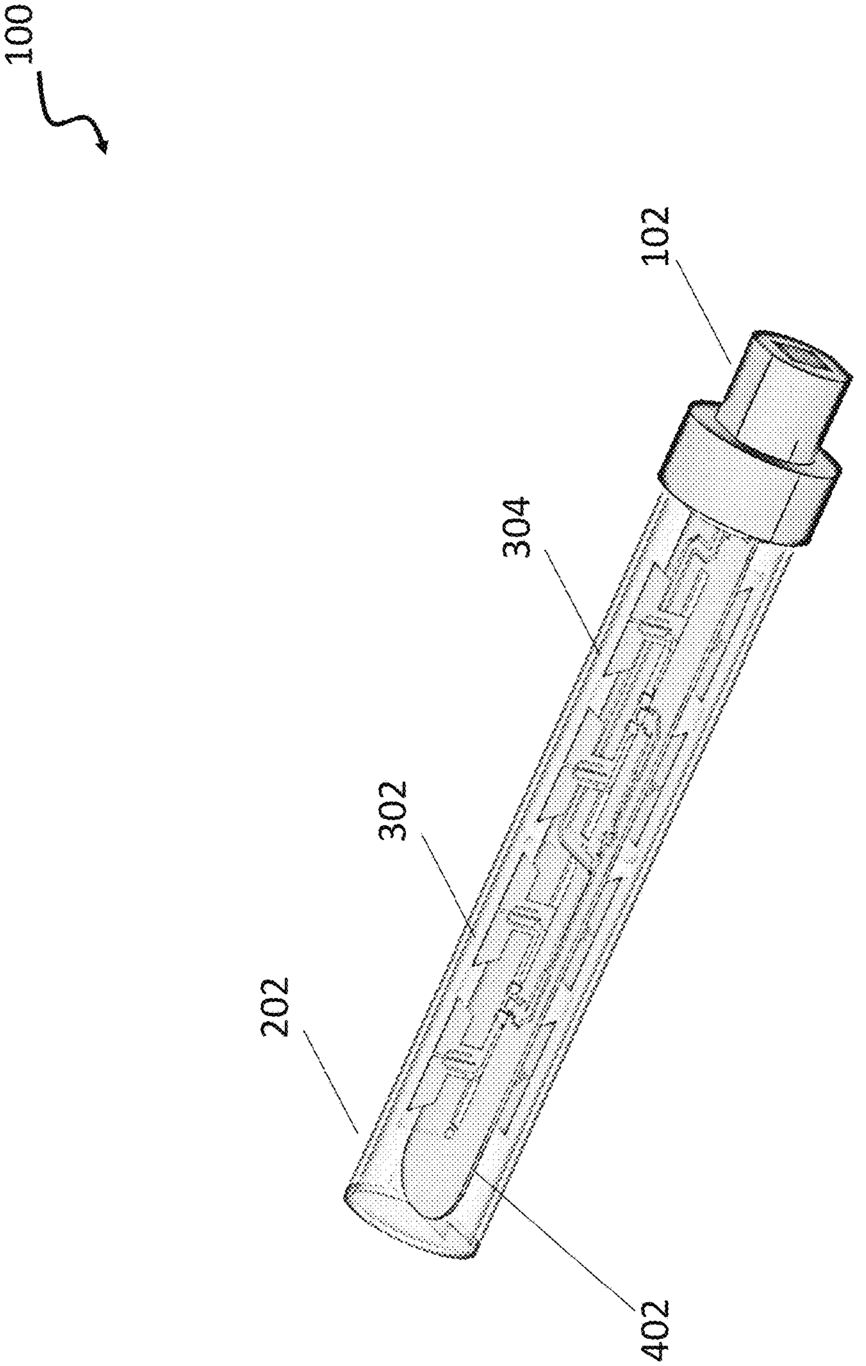
FIG. 10 is a perspective view of an antenna according to an embodiment.

A completed design of the antenna 100 is shown in FIG. 10 with outer structures made partially transparent for the convenience of viewing inner structures. The connector 102, radome 202, two antenna PCBs 302 and 304, and host PCB 402 are labeled for convenience of reference.

Figure 11:
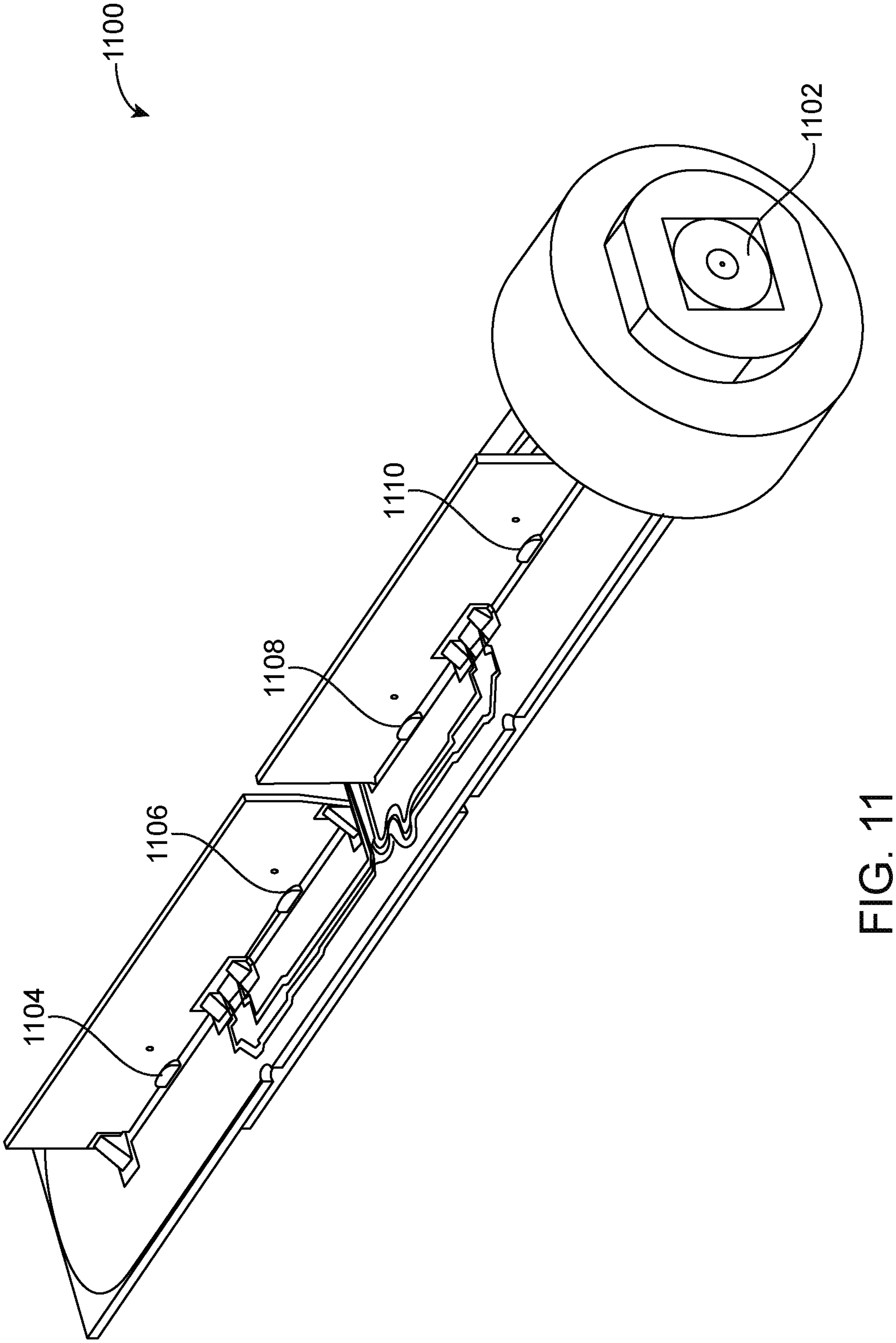
FIG. 11 is a perspective view of a simulation model of an antenna feed network according to an embodiment.
Figure 12:
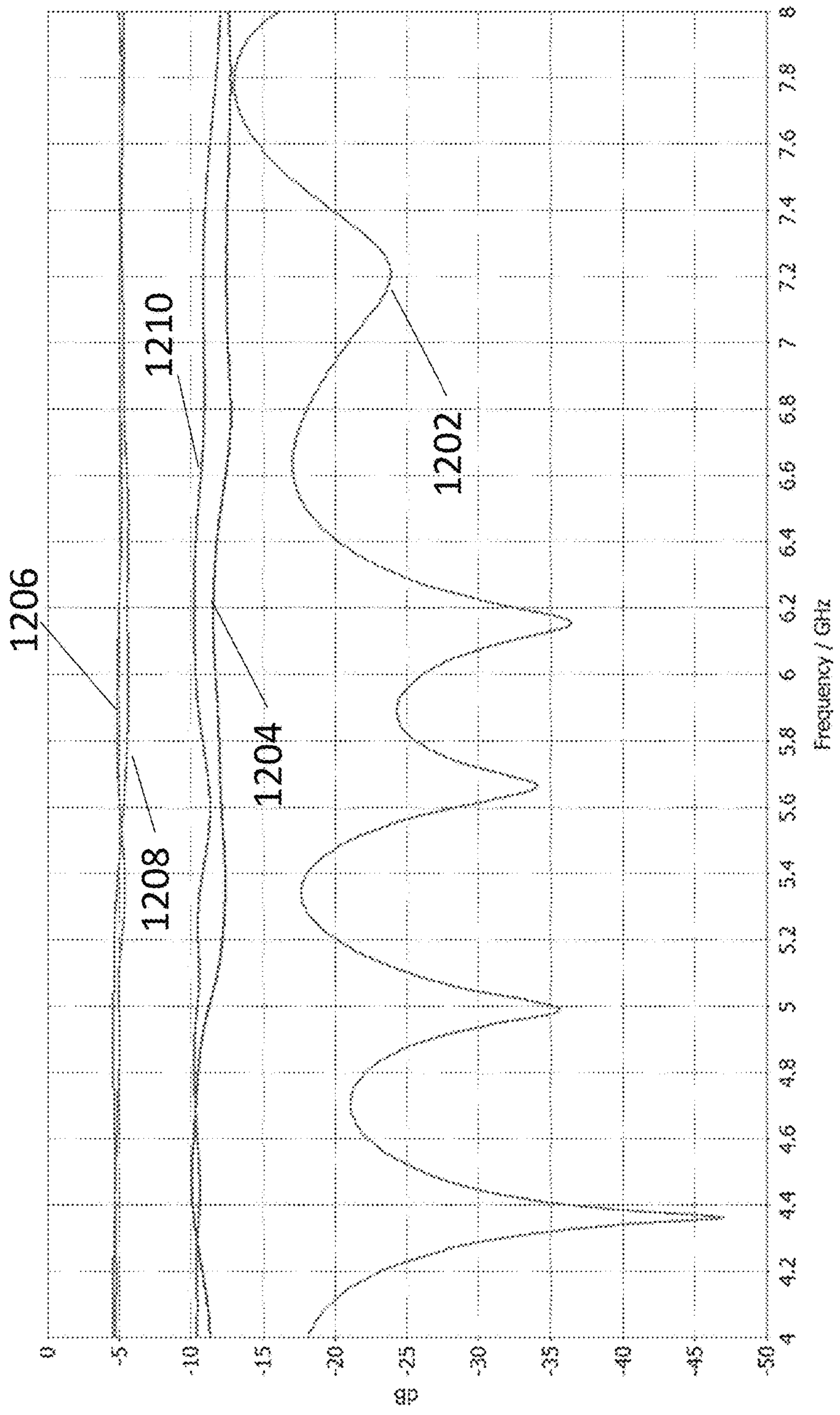
FIG. 12 is a graph of s-parameters of the feed network of FIG. 11.

FIG. 11 illustrates a simulation model 1100. Scattering parameters of the simulation model 1100 shown in FIG. 11 are shown in the FIG. 12 graph. Port 1102 is a common port, e.g., port 204 of FIG. 2. Ports 1104, 1106, 1108, 1110 of the simulation model 1100 terminate the 50Ω lines just before the split to two 100Ω lines that feed antennas. In the simulation result shown in FIG. 12, the curve 1202 represents the return loss simulated at the common port 1102 over the operational bandwidth, illustrated as 4-8 GHz in FIG. 12. Curves 1204, 1206, 1208, 1210 of FIG. 12 correspond, respectively, to the mutual coupling to ports 1104, 1106, 1108, 1110 of the simulation model 1100 from common port 1102. As shown in the simulation result of FIG. 12, the design achieves a fairly flat, e.g., 5-6 dB amplitude, taper with good matching over the operational bandwidth. Table 1 below shows specifications of the simulation model shown in FIG. 4.

TABLE 1

| Design Parameter | Design Targets | 4.9 GHz Specs | 5 GHz Specs | 6 GHz Specs | Comment |
|---|---|---|---|---|---|
| Frequency | 4900-6900 MHz | 4940-4990 MHz | 5150-5875 MHz | 5925-6875 MHz | Design covers 4.9 GHz |
| Nominal Input Impedance | 50Ω | 50Ω | 50Ω | 50Ω | — |
| Maximum VWSR | 1.5:1 | 2:1 | 1.5:1 | 1.5:1 | — |
| Polarization | Vertical | Vertical | Vertical | Vertical | — |
| Peak Gain | 6/7/8 dBi | 6 dBi | 7 dBi | 8 dBi | — |
| SLL 30° Above & Below the Horizon | <−15 dB | N/A | <−13 dB | <−15 dB | Allowable peak EIRP is 36 dBm; max. skyward EIRP is 21 dBm (−15 = 21 − 36). |
| Azimuth Plane Ripple | <3 dB | <2 dB | <2.5 dB | <3 dB | — |
| Elevation Plane Beamwidth | 15° < BMW < 30° | 28° | 25° | 20° | — |

Figure 13:
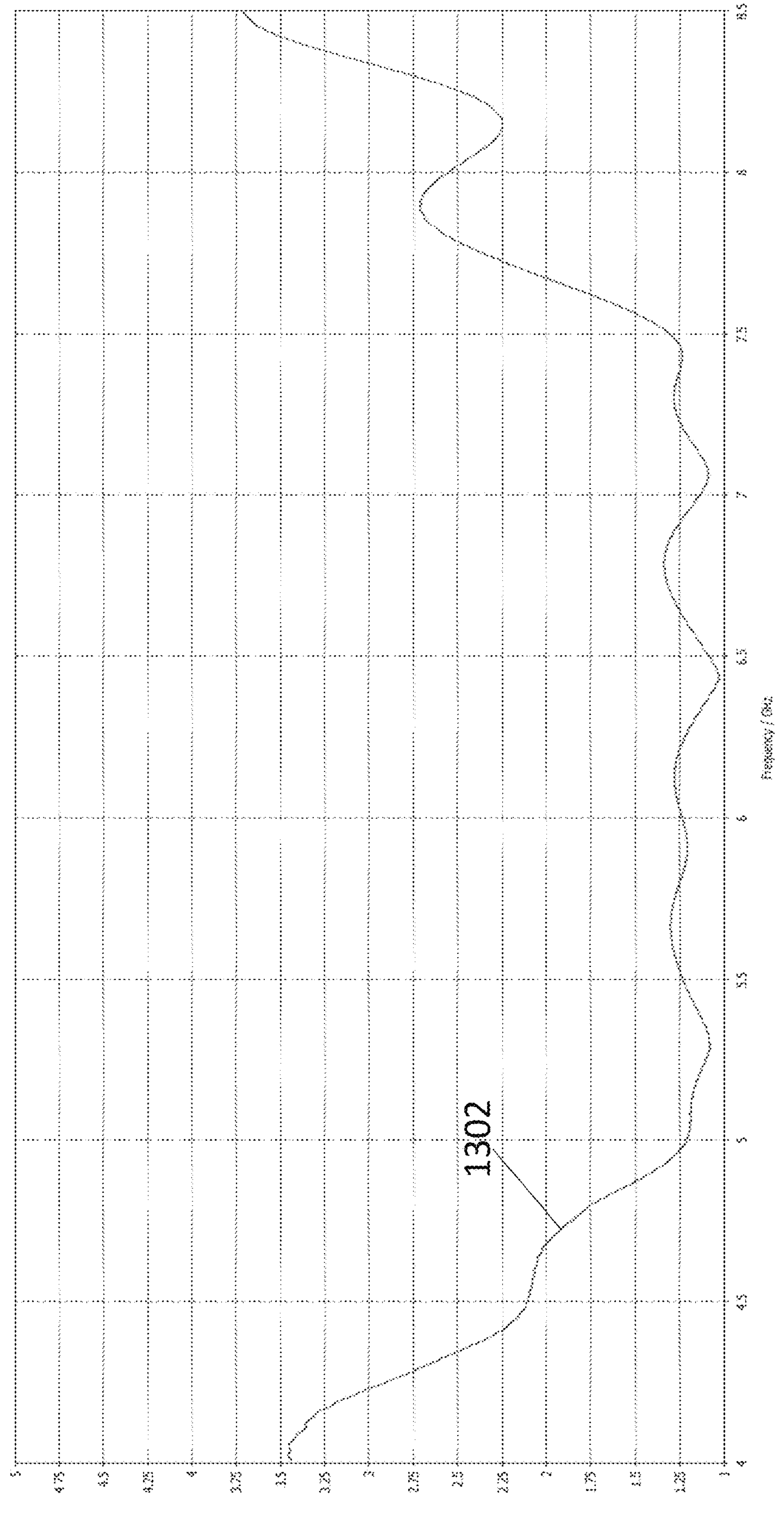
FIG. 13 is a graph of simulation results for a voltage standing wave ratio (VWSR) across an operational band using a simulation model based on the model of FIG. 4.
Figure 14:
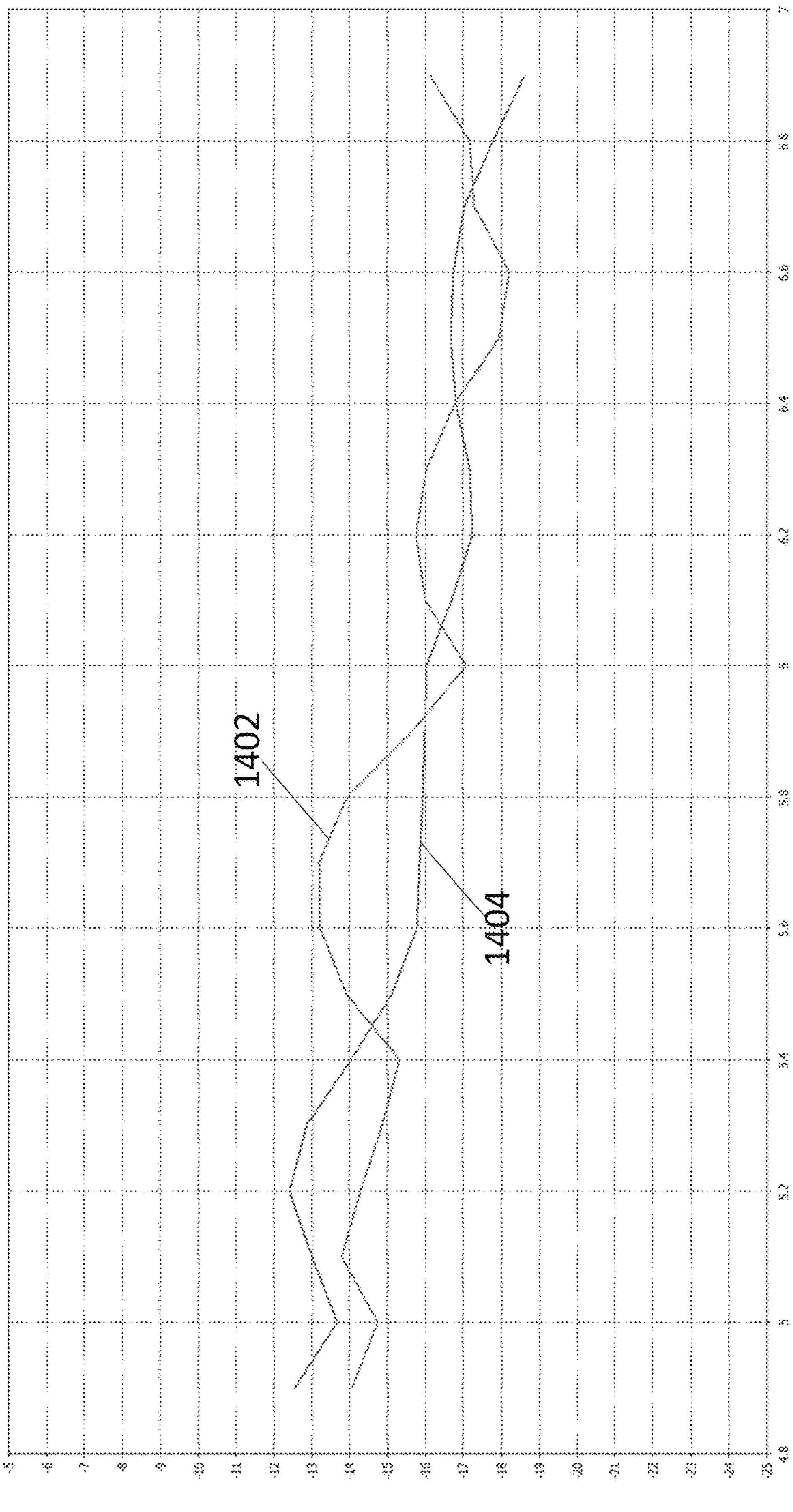
FIG. 14 is a graph of simulation results for a sidelobe level (SLL) at ≥30° above and below the horizon across an operational band using the model of FIG. 4.
Figure 15:
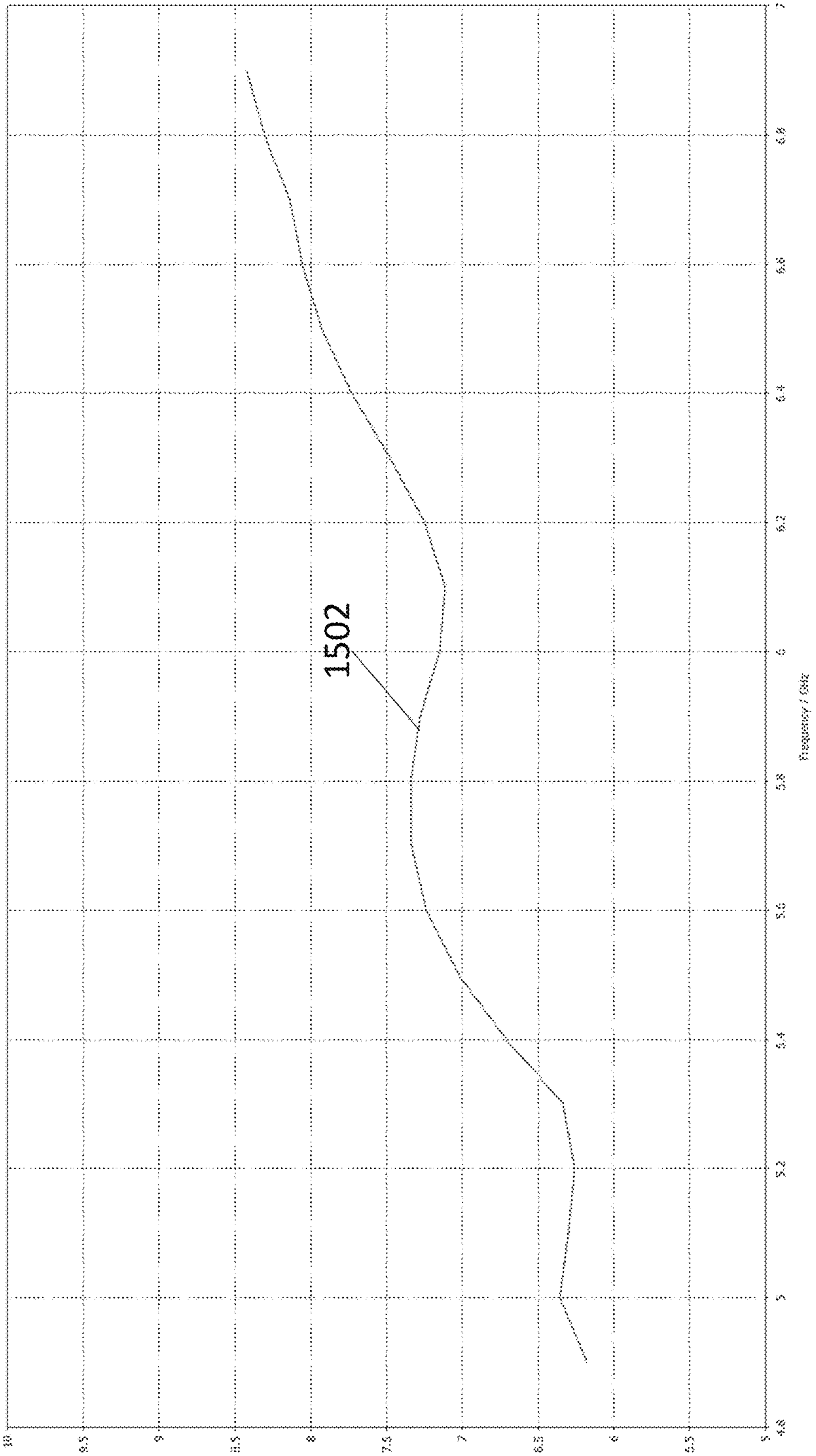
FIG. 15 is a graph of simulation results for a realized peak gain across an operational band using the model of FIG. 4.
Figure 16:
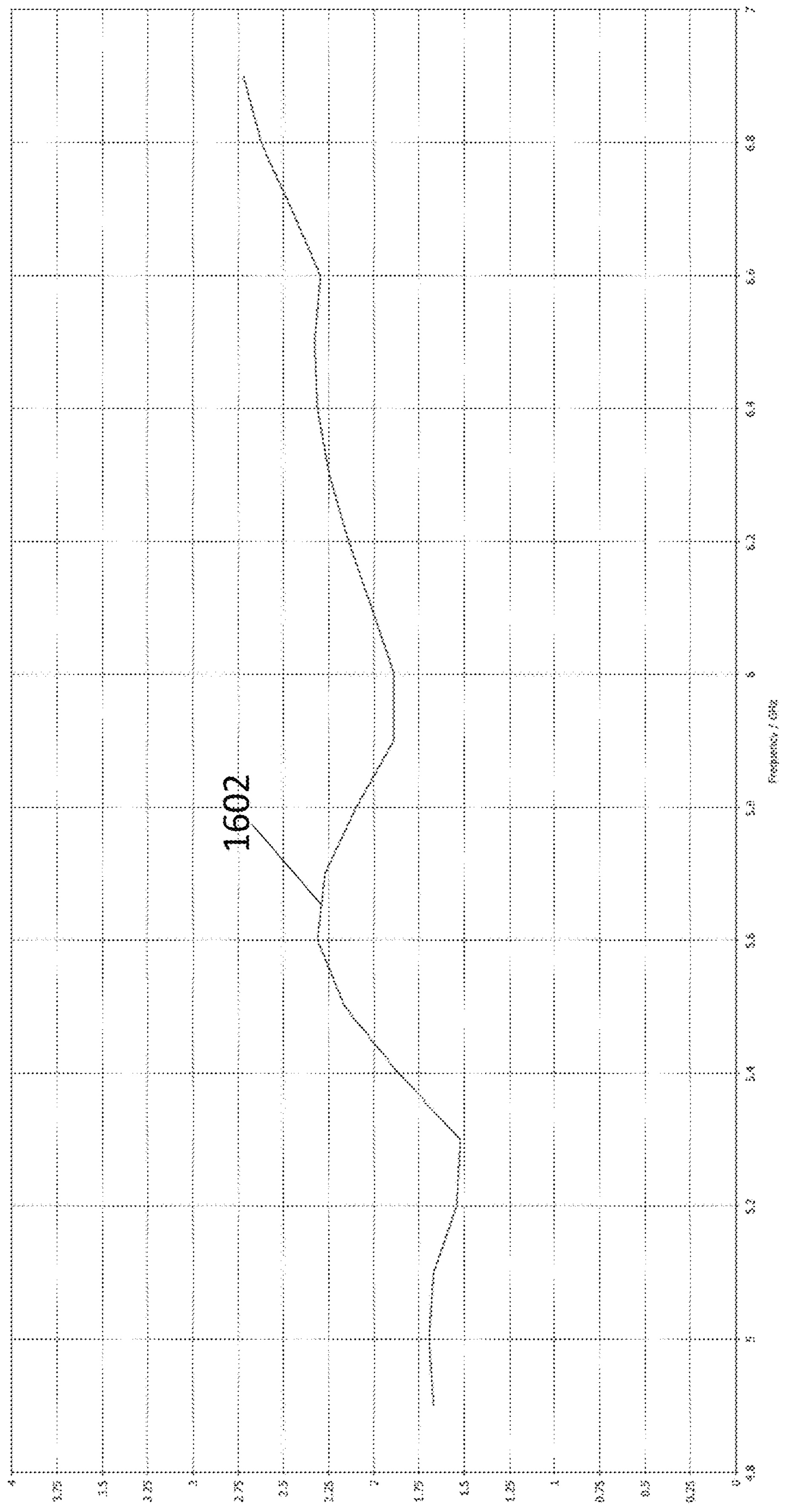
FIG. 16 is a graph of simulation results for an azimuth plane ripple across an operational band using the model of FIG. 4.
Figure 17:
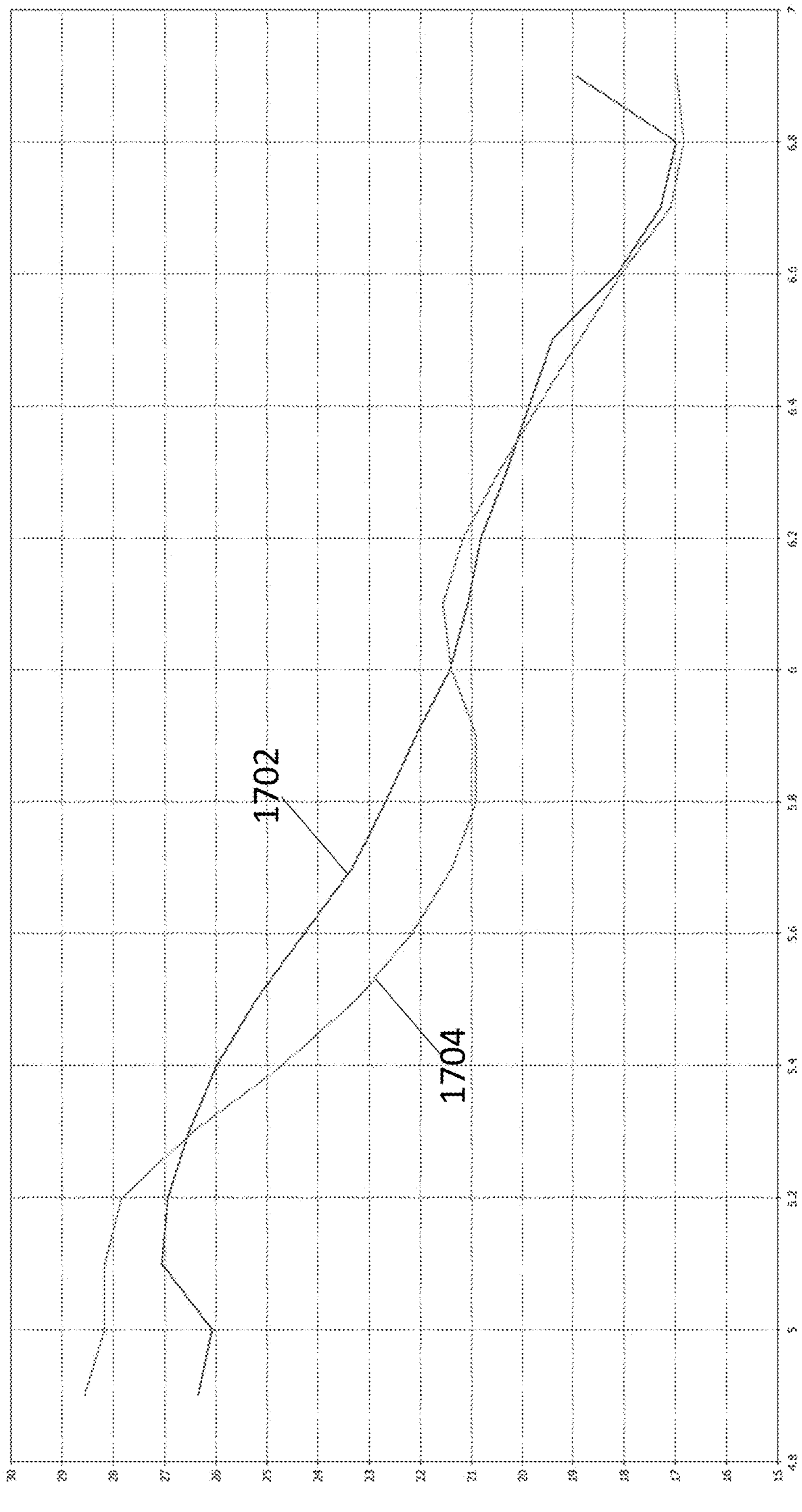
FIG. 17 is a graph of simulation results for elevation plane beamwidths across an operational band using the model of FIG. 4.
Figure 18:
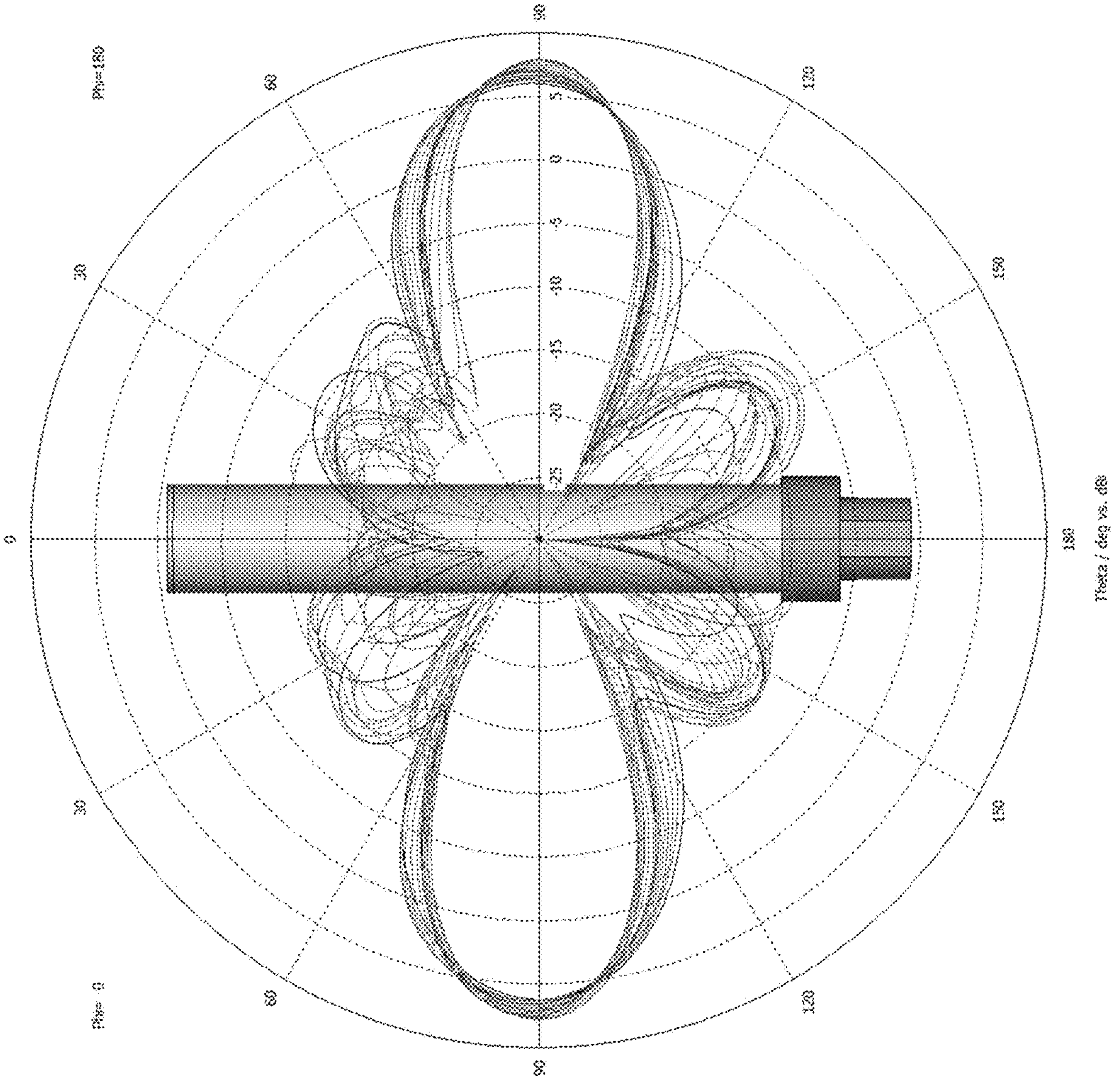
FIG. 18 is a graph of far-field realized gain radiation patterns in the phi(Φ)=0° (or phi (Φ)=180°) elevation plane using the model of FIG. 4.
Figure 19:
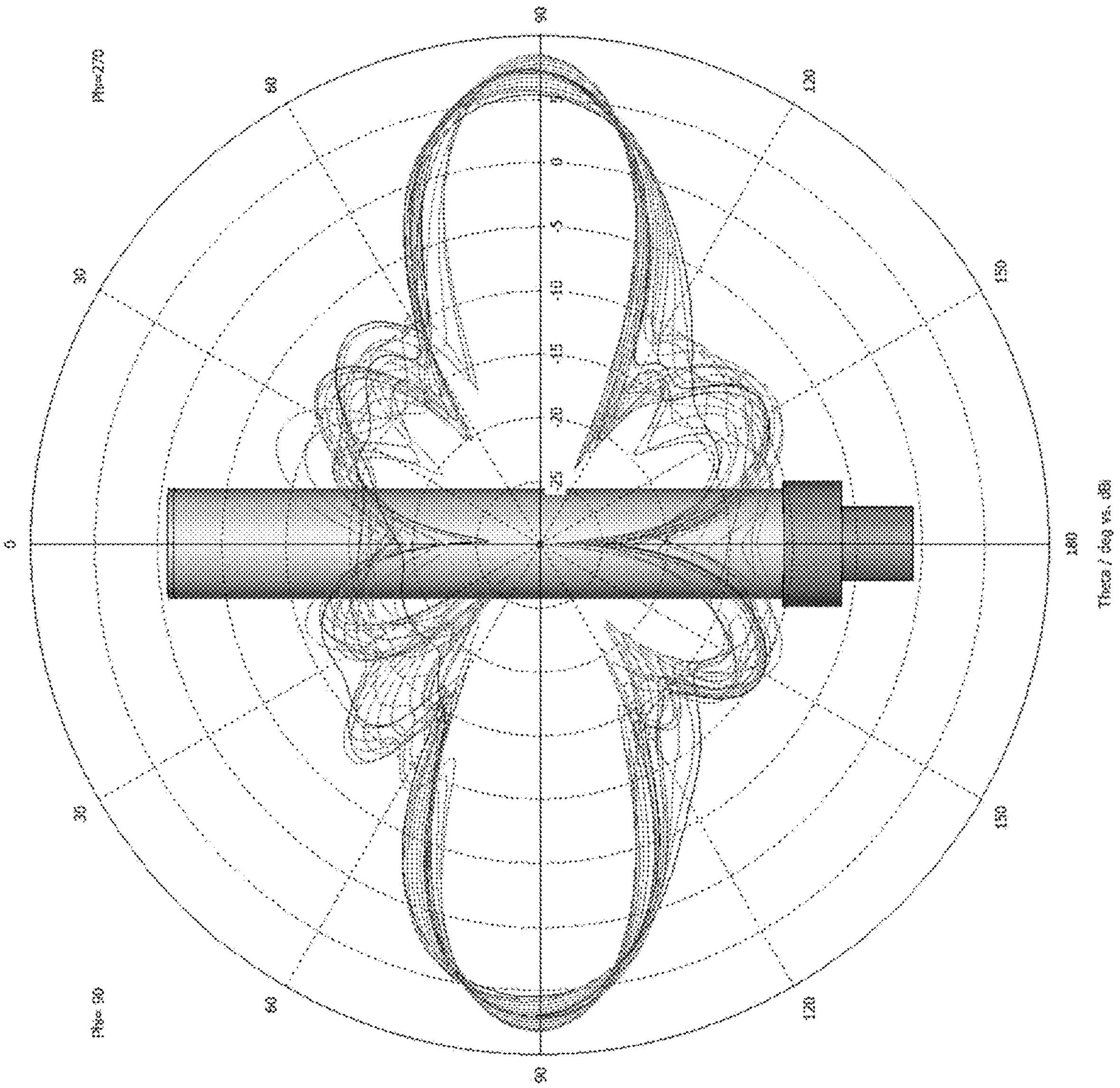
FIG. 19 is a graph of simulation results for elevation plane radiation patterns for far-field realized gain at phi (Φ)=90° (or phi (Φ)=270°) using the model of FIG. 4.
Figure 20:
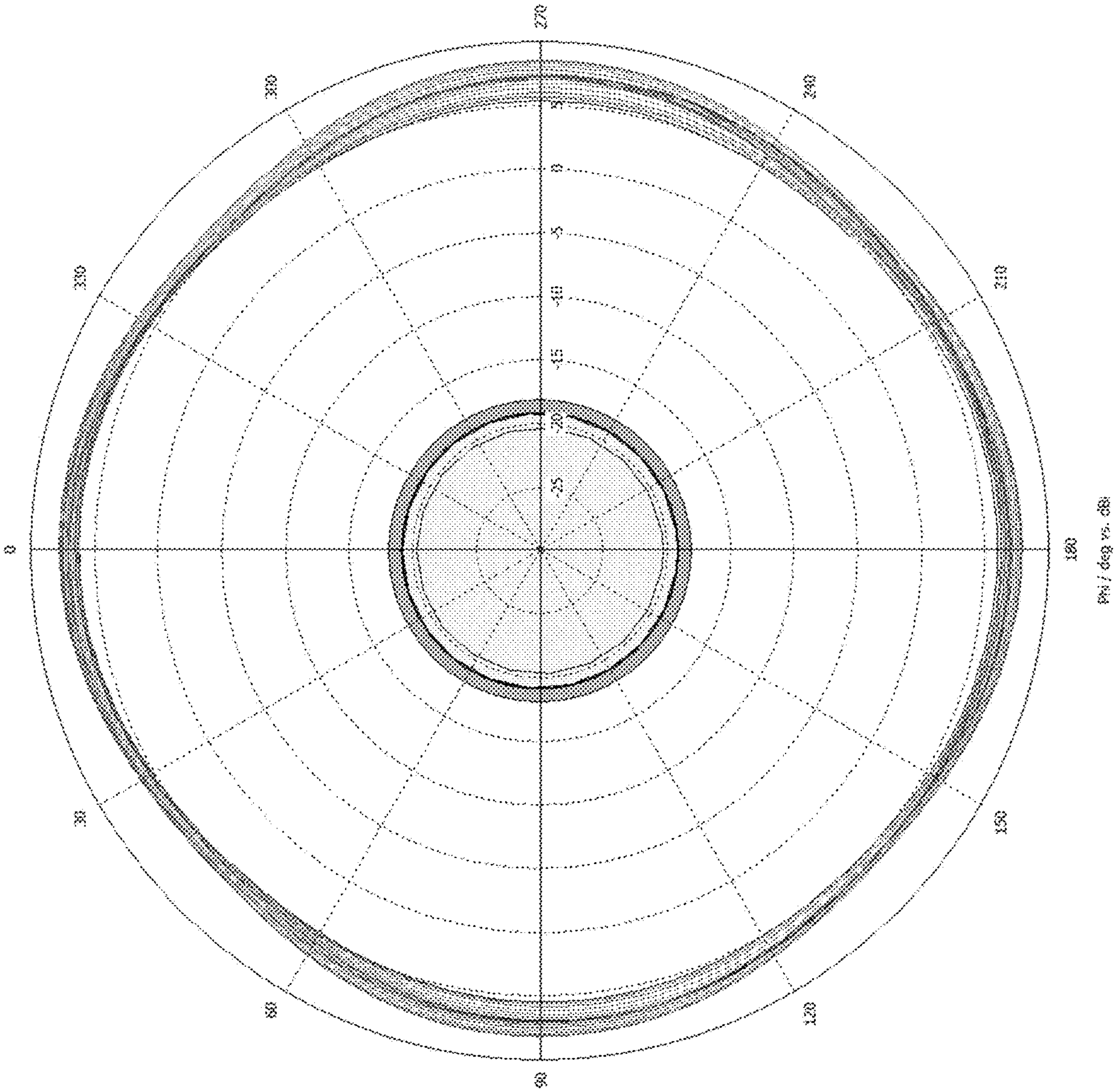
FIG. 20 is a graph of simulation results for azimuth plane radiation patterns for far-field realized gain at theta (θ)=90° using the model of FIG. 4.

FIGS. 13-20 show additional simulation results using a simulation model based on the model of FIG. 4. FIG. 13 shows a voltage standing wave ratio (VWSR) at curve 1302 across the operational band. FIG. 14 shows a sidelobe level (SLL) at ≥30° above and below the horizon across the operational band. The sidelobe level is a difference between the peak gain of the skyward region versus the peak gain in the simulated antenna. In FIG. 14, curve 1402 shows the SLL of the upper hemisphere, and curve 1404 shows the SLL of the lower hemisphere. FIG. 15 shows a realized peak gain at curve 1502 across the operational band. FIG. 16 shows an azimuth plane ripple at curve 1602 across the operational band. FIG. 17 shows elevation plane beamwidths across the operational band. In FIG. 17, curve 1702 shows the beamwidth when phi (Φ)=0°, and curve 1704 shows the beamwidth when phi (Φ)=90°. Phi (Φ) refers to the spherical coordinate that subtends from the x-axis in the azimuth plane, e.g., elevation plane cuts. Both phi(Φ)=0 and phi(Φ)=90 cut through the antenna along the body of the antenna. Phi (Φ)=0 is the x-z plane and phi (Φ)=90 is the y-z plane. FIG. 18 shows elevation plane radiation patterns for far-field realized gain at phi (Φ)=0° (or phi (Φ)=) 180°. FIG. 19 shows elevation plane radiation patterns for far-field realized gain at phi(Φ)=90° (or phi (Φ)=) 270°. FIG. 20 shows azimuth plane radiation patterns for far-field realized gain at theta (θ)=90°. Theta (θ)=90° is the azimuth plane, e.g., perpendicular to the orientation of the antenna, which is a cross-section of the antenna, e.g., an x-y plane.

FIGS. 21-28 show measured experimental results using prototype antennas constructed according to an embodiment. All radiated data was measured in a calibrated MVG SG-24 fully anechoic chamber. The chamber was calibrated using an SH-800 standard gain horn using the gain substitution method. The conducted data (return loss/VSWR) was measured using a Keysight E5071C ENA that was calibrated to a 50 Ohm reference impedance using a Keysight 85052D calibration kit.

Figure 21:
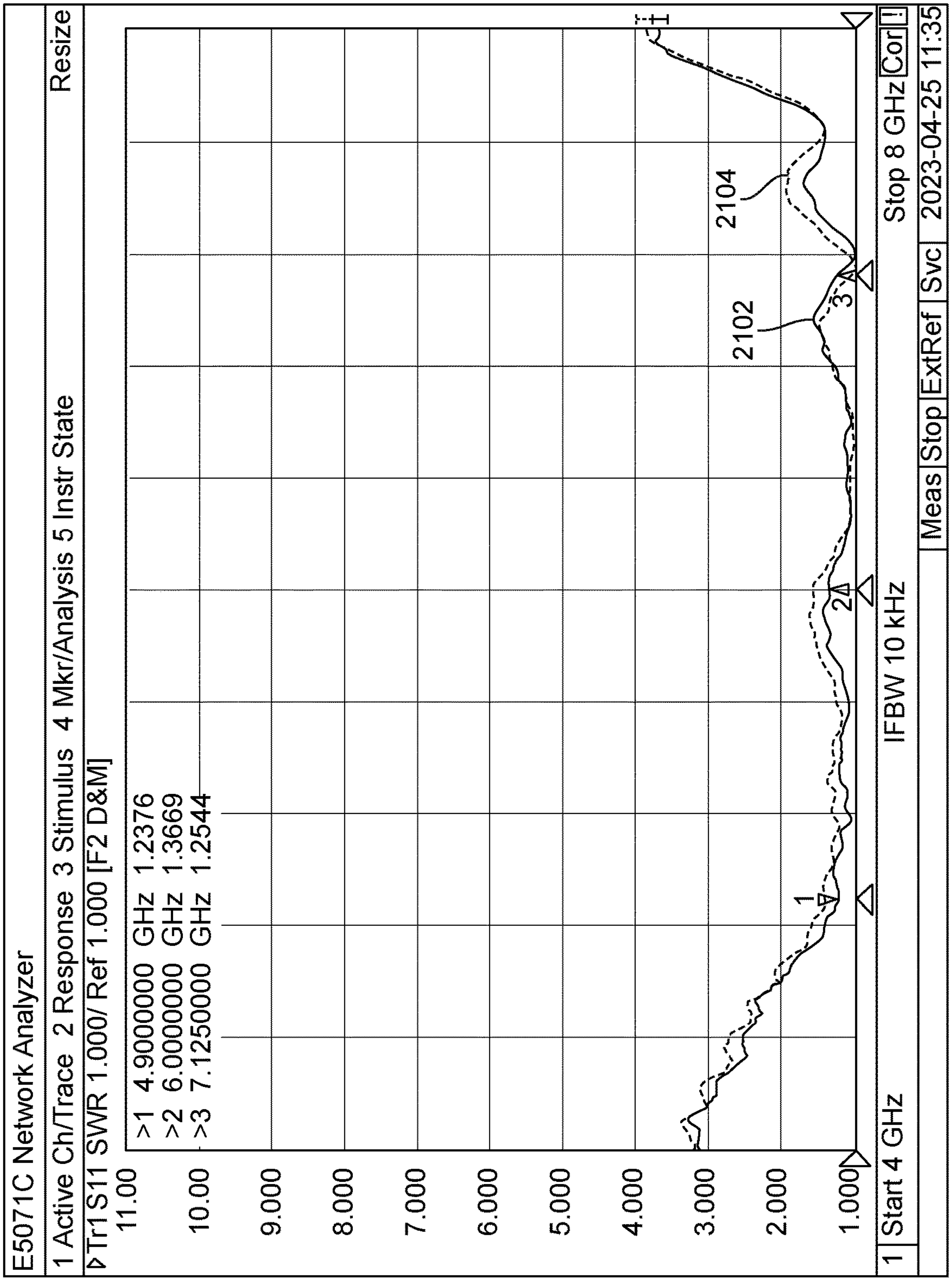
FIG. 21 is a screenshot of experimental results of a VWSR across an operational band for a prototype.
Figure 22:
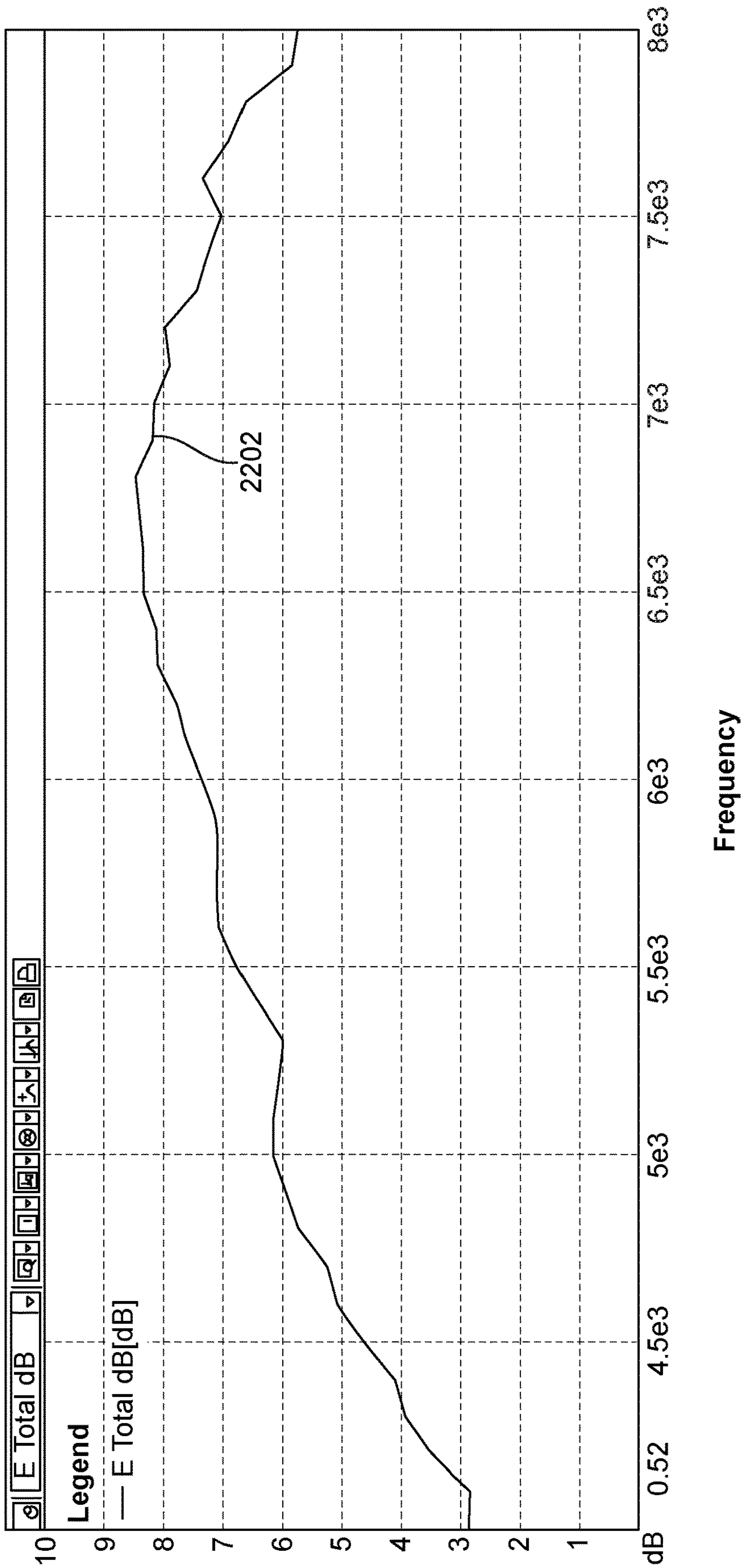
FIG. 22 is a screenshot of experimental results of a peak gain across an operational band for a prototype.
Figure 23:
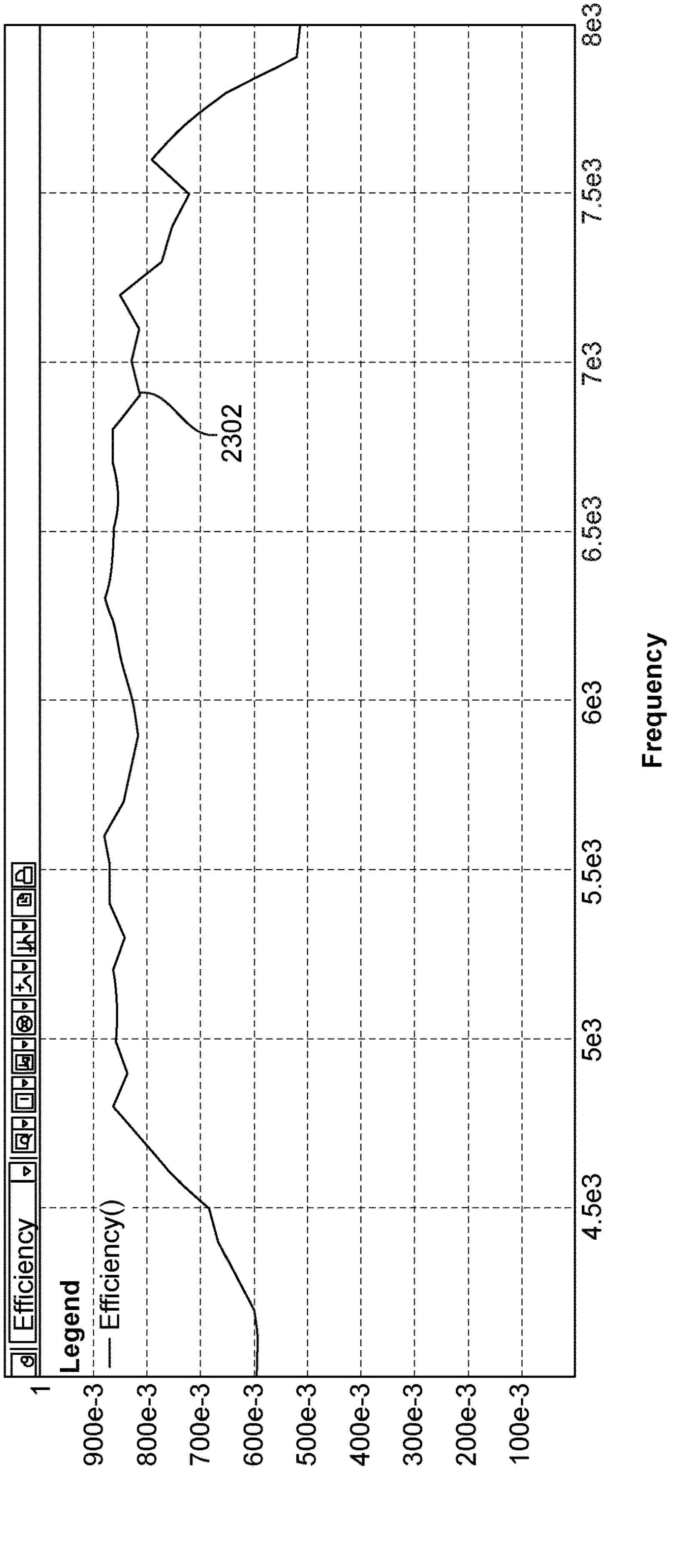
FIG. 23 is a screenshot of experimental results of a total efficiency across an operational band for a prototype.
Figure 24:
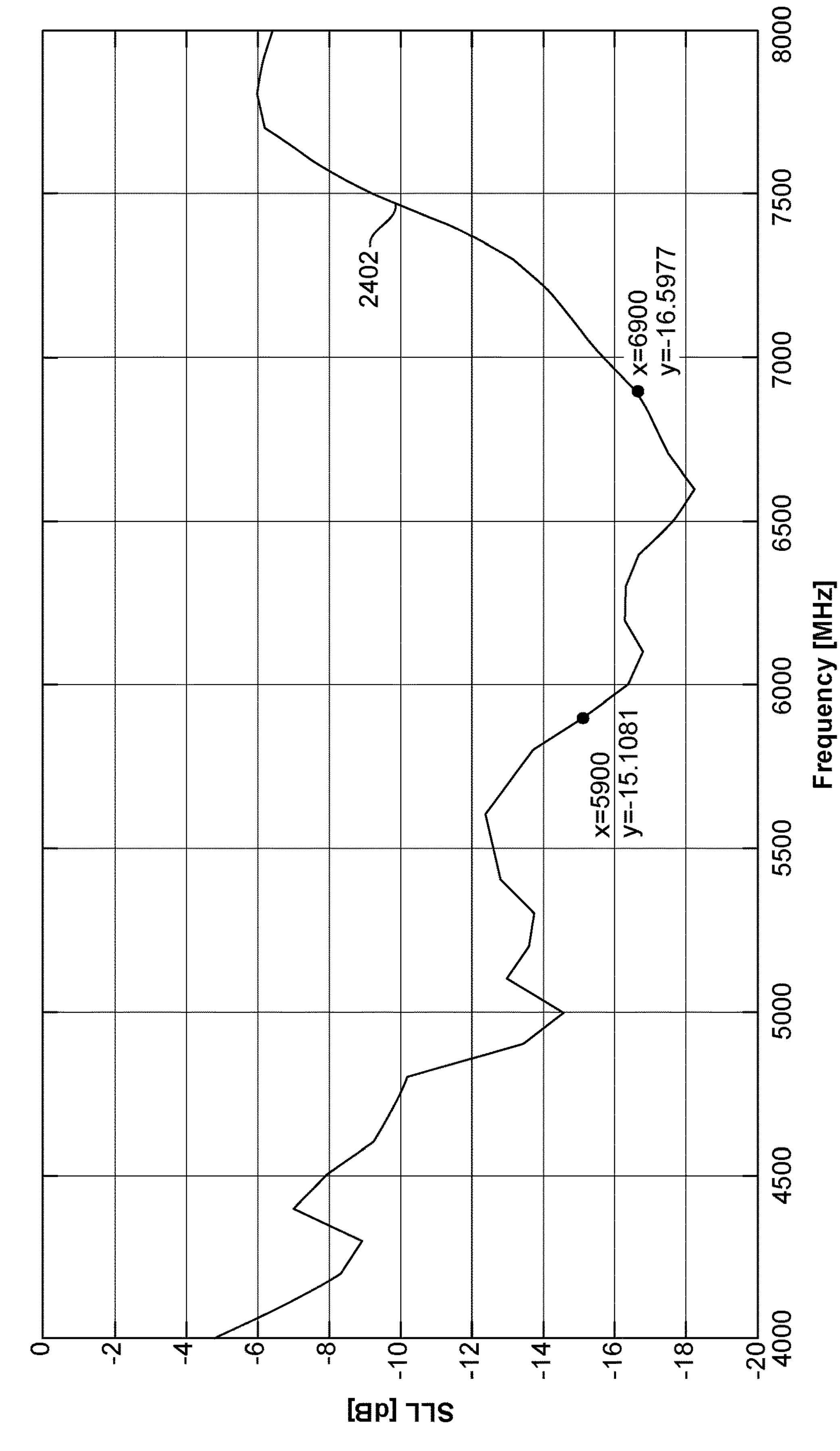
FIG. 24 is a graph of experimental results of an upper hemisphere SLL across an operational band for a prototype.
Figure 25:
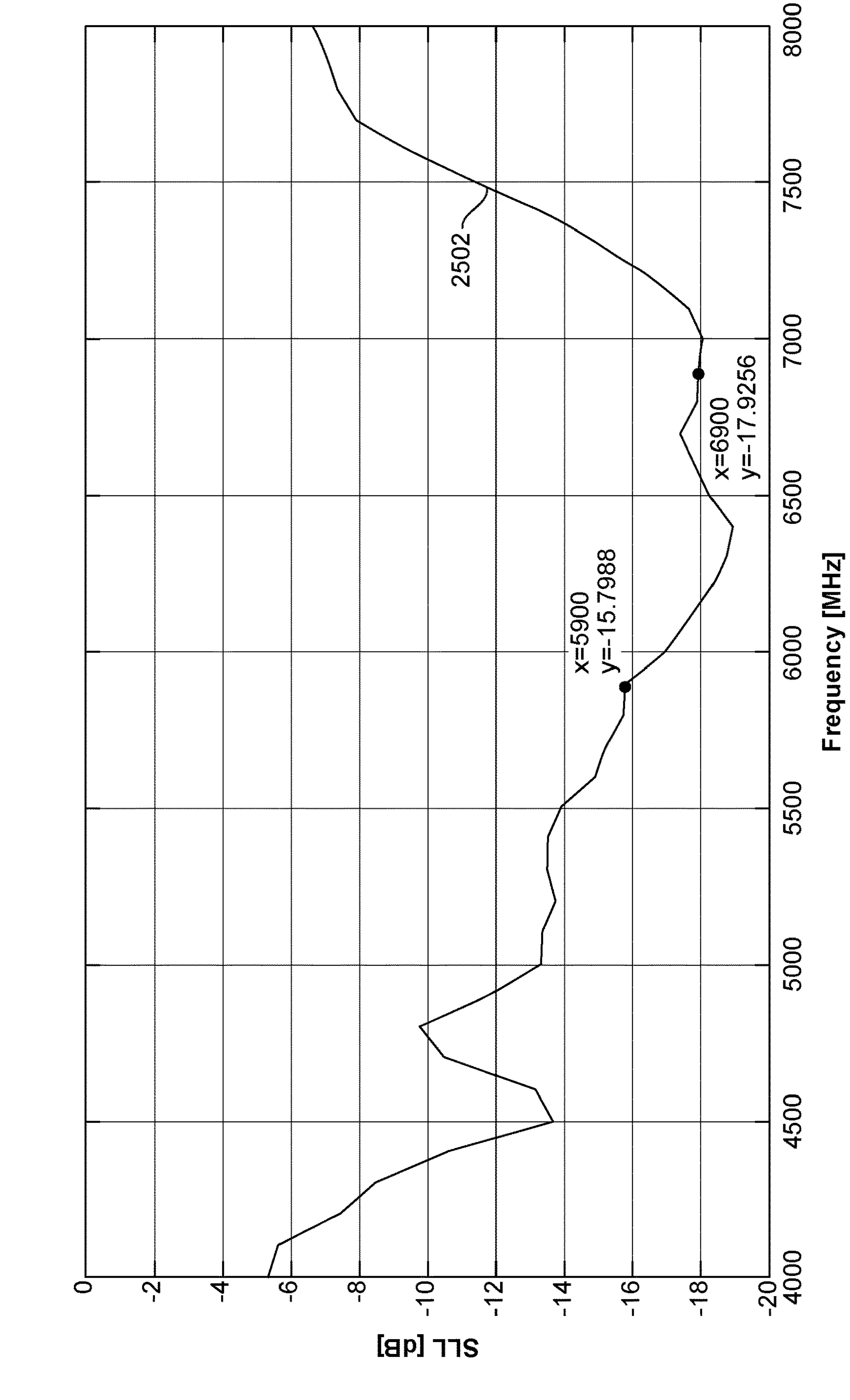
FIG. 25 is a graph of experimental results of a lower hemisphere SLL across an operational band for a prototype.

FIG. 21 shows a screenshot of a network analyzer of a VWSR across an operational band of 4-8 GHz. In FIG. 21, curve 2102 shows the VWSR of a first prototype, and curve 2404 shows the VWSR of a second prototype. FIG. 22 shows a screenshot of a peak gain at curve 2202 across the operational band of 4-8 GHz. In FIG. 22, the peak gain from 4.9-6.9 GHz is about 8 dBi. FIG. 23 shows a screenshot of a total efficiency at curve 2302 across the operational band of 4-8 GHz. FIG. 24 shows a graph of an upper hemisphere SLL at curve 2402 across the operational band of 4-8 GHz. In FIG. 24, the measured result meets a target result of 15 dB SLL from 5.925-6.875 GHz. FIG. 25 shows a graph of a lower hemisphere SLL at curve 2502 across the operational band of 4-8 GHz. In FIG. 25, the measured result meets a target result of 15 dB SLL from 5.925-6.875 GHz.

Figure 26:
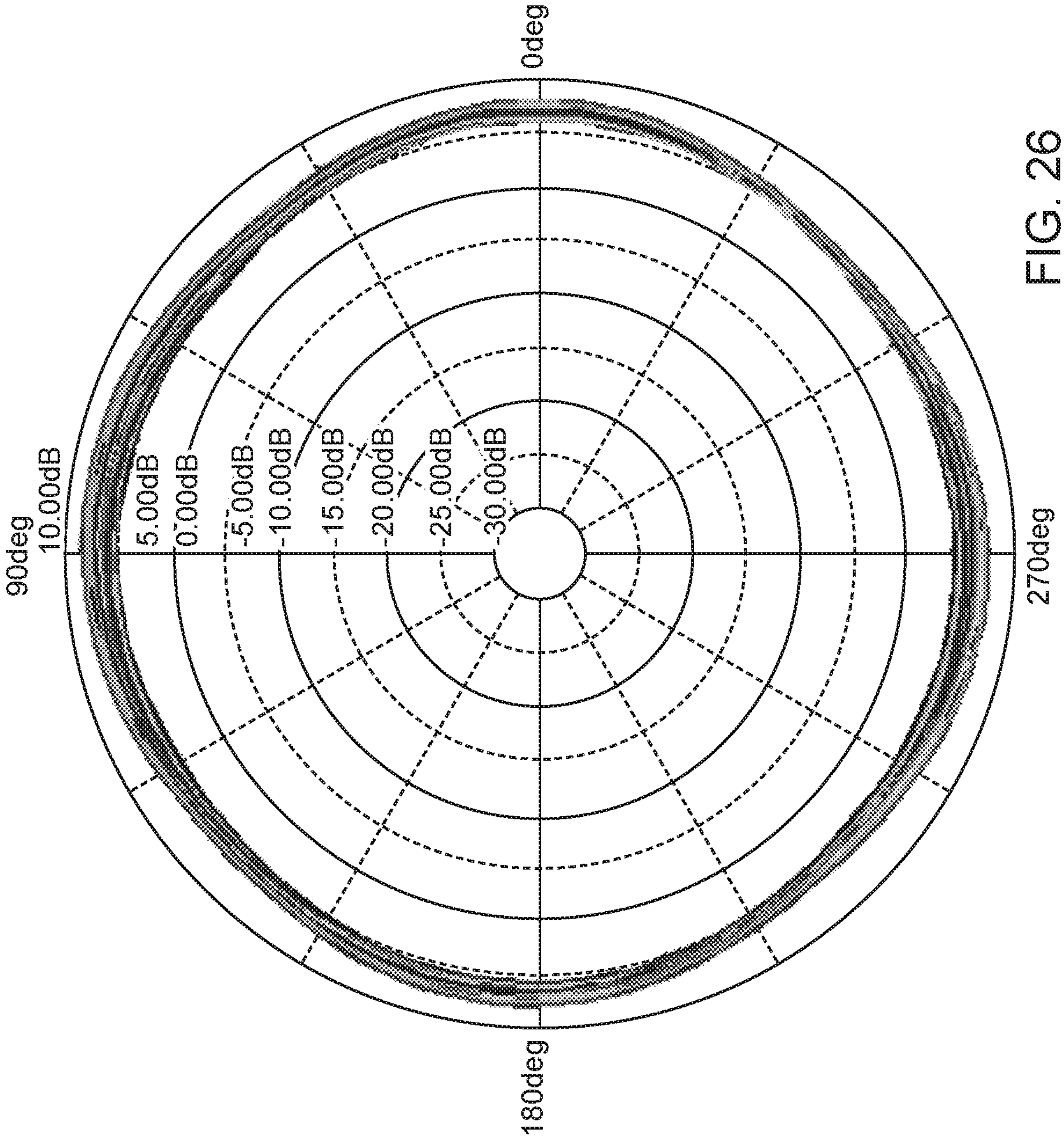
FIG. 26 is a graph of experimental results of azimuth plane radiation patterns for realized gain at theta (θ)=90° for a prototype.
Figure 27:
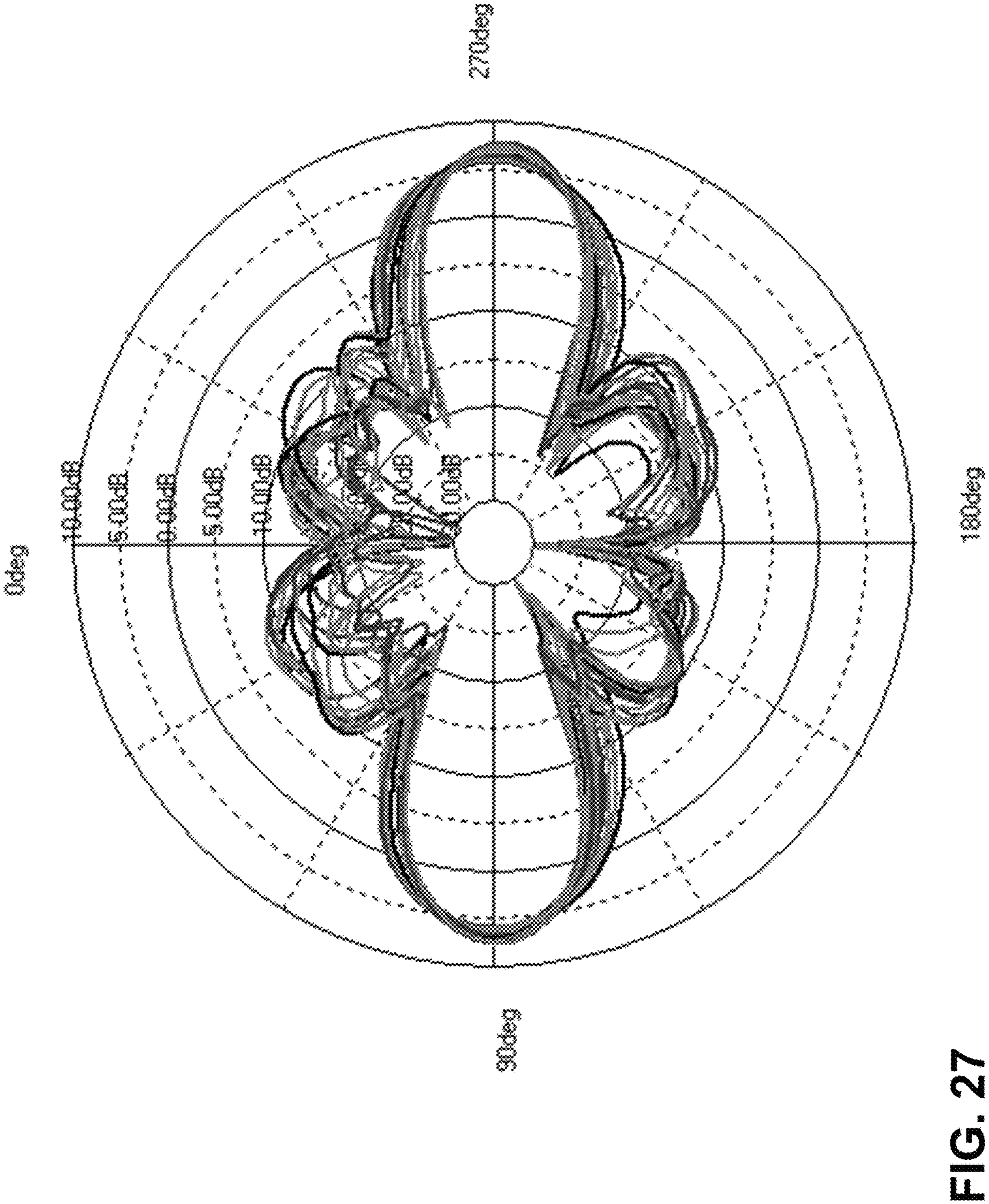
FIG. 27 is a graph of experimental results of elevation plane radiation patterns for realized gain at phi (Φ)=0° for a prototype.
Figure 28:
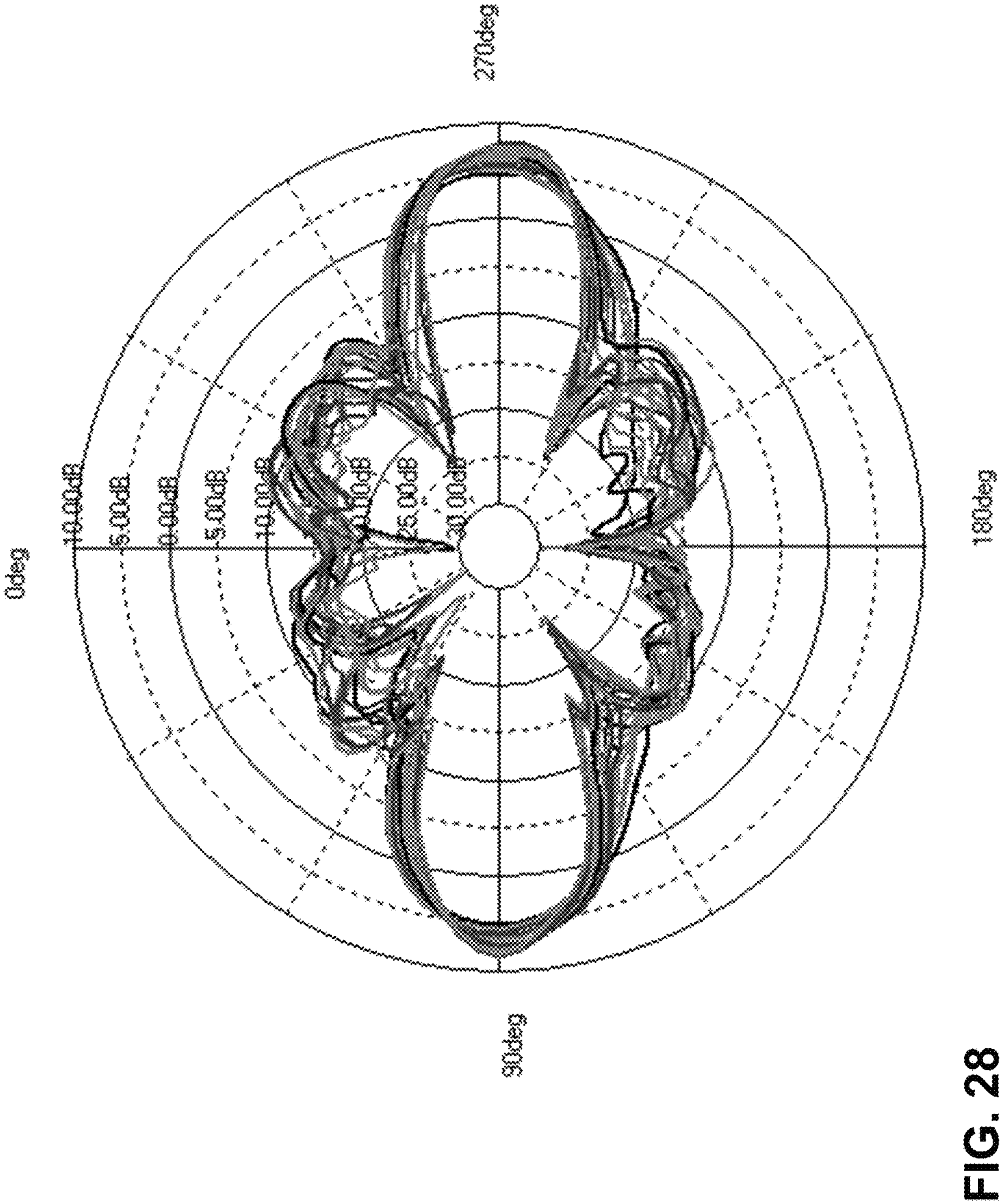
FIG. 28 is a graph of experimental results of elevation plane radiation patterns for realized gain at phi (Φ)=90° for a prototype.

FIG. 26 shows a graph of azimuth plane radiation patterns for realized gain at theta (θ)=90°. Table 2 below shows a chart with measured values of the azimuth plane radiation patterns for realized gain at theta (θ)=90° of FIG. 26 from the experimental results using a prototype at 4900-6900 MHz. FIG. 27 shows a graph of elevation plane radiation patterns for realized gain at phi (Φ)=0°. Table 3 below shows a chart with measured values of the elevation plane radiation patterns for realized gain at phi (Φ)=0° of FIG. 27 from the experimental results using a prototype at 4900-6900 MHz. FIG. 28 shows a graph of elevation plane radiation patterns for realized gain at phi (Φ)=90°. Table 4 below shows a chart with measured values of the elevation plane radiation patterns for realized gain at phi (Φ)=90° of FIG. 28 from the experimental results using a prototype at 4900-6900 MHz.

TABLE 2

| Layer (MHz) | Max Value (dB) | Position (deg) | Min Value (dB) | Position (deg) | Max-Min (dB) | Average (dB) | Standard |
|---|---|---|---|---|---|---|---|
| 4900 | 5.97 | 357.00 | 4.24 | 48.00 | 1.73 | 4.93 | 0.50 |
| 5000 | 6.17 | 357.00 | 4.48 | 303.00 | 1.69 | 5.20 | 0.48 |
| 5100 | 6.15 | 0.00 | 4.23 | 306.00 | 1.92 | 5.26 | 0.52 |
| 5200 | 6.07 | 357.00 | 4.52 | 306.00 | 1.55 | 5.38 | 0.43 |
| 5300 | 5.99 | 93.00 | 4.49 | 309.00 | 1.51 | 5.35 | 0.42 |
| 5400 | 6.38 | 96.00 | 4.57 | 312.00 | 1.81 | 5.58 | 0.49 |
| 5500 | 6.77 | 93.00 | 4.55 | 312.00 | 2.22 | 5.73 | 0.57 |
| 5600 | 7.07 | 93.00 | 4.77 | 315.00 | 2.29 | 6.00 | 0.61 |
| 5700 | 7.12 | 90.00 | 4.75 | 315.00 | 2.37 | 5.95 | 0.60 |
| 5800 | 7.08 | 90.00 | 4.71 | 315.00 | 2.38 | 5.99 | 0.60 |
| 5900 | 7.14 | 87.00 | 4.58 | 315.00 | 2.56 | 5.97 | 0.63 |
| 6000 | 7.34 | 87.00 | 4.79 | 312.00 | 2.55 | 6.11 | 0.62 |
| 6100 | 7.59 | 87.00 | 4.68 | 312.00 | 2.91 | 6.24 | 0.74 |
| 6200 | 7.77 | 87.00 | 4.68 | 312.00 | 3.10 | 6.35 | 0.82 |
| 6300 | 8.09 | 87.00 | 4.91 | 312.00 | 3.17 | 6.49 | 0.83 |
| 6400 | 8.13 | 87.00 | 5.01 | 312.00 | 3.12 | 6.56 | 0.80 |
| 6500 | 8.35 | 87.00 | 5.03 | 312.00 | 3.32 | 6.72 | 0.83 |
| 6600 | 8.33 | 87.00 | 5.14 | 312.00 | 3.19 | 6.79 | 0.79 |
| 6700 | 8.44 | 87.00 | 5.25 | 315.00 | 3.19 | 6.94 | 0.78 |
| 6800 | 8.48 | 87.00 | 5.40 | 315.00 | 3.09 | 7.05 | 0.78 |
| 6900 | 8.21 | 87.00 | 5.18 | 315.00 | 3.03 | 6.80 | 0.79 |

TABLE 3

| Layer (MHz) | Max Value (dB) | Position (deg) | Min Value (dB) | Position (deg) | Beamwidth (deg) | Max/Min (dB) | Average (dB) | Standard |
|---|---|---|---|---|---|---|---|---|
| 4900 | 5.95 | 90.00 | −29.78 | 0.00 | 27.54 | 35.73 | −5.26 | 9.48 |
| 5000 | 6.15 | 90.00 | −35.64 | −3.00 | 26.98 | 41.79 | −5.26 | 9.36 |
| 5100 | 6.15 | 90.00 | −27.16 | −3.00 | 26.28 | 33.31 | −5.15 | 8.38 |
| 5200 | 6.06 | 90.00 | −23.04 | −123.00 | 26.43 | 29.11 | −4.96 | 7.53 |
| 5300 | 5.87 | −90.00 | −21.74 | 174.00 | 25.93 | 27.61 | −5.10 | 7.32 |
| 5400 | 5.98 | −90.00 | −26.53 | 174.00 | 25.63 | 32.51 | −5.03 | 7.27 |
| 5500 | 5.97 | −90.00 | −26.09 | 174.00 | 24.93 | 32.06 | −5.25 | 7.21 |
| 5600 | 6.25 | −90.00 | −26.69 | 174.00 | 23.52 | 32.94 | −5.35 | 7.32 |
| 5700 | 6.18 | −90.00 | −22.10 | 174.00 | 22.80 | 28.29 | −5.73 | 7.33 |

TABLE 3-continued

| Layer (MHz) | Max Value (dB) | Position (deg) | Min Value (dB) | Position (deg) | Beamwidth (deg) | Max/Min (dB) | Average (dB) | Standard |
|---|---|---|---|---|---|---|---|---|
| 5800 | 6.34 | −90.00 | −26.86 | 15.00 | 22.10 | 33.20 | −5.97 | 7.84 |
| 5900 | 6.42 | −90.00 | −26.20 | 24.00 | 22.02 | 32.61 | −6.30 | 8.14 |
| 6000 | 6.60 | 90.00 | −32.90 | −24.00 | 20.95 | 39.50 | −6.56 | 8.94 |
| 6100 | 6.93 | 90.00 | −29.95 | −9.00 | 20.11 | 36.88 | −6.45 | 9.30 |
| 6200 | 7.15 | 90.00 | −30.22 | 120.00 | 19.80 | 37.37 | −6.20 | 8.81 |
| 6300 | 7.18 | 90.00 | −27.03 | 123.00 | 19.68 | 34.20 | −6.20 | 8.47 |
| 6400 | 7.27 | 90.00 | −27.76 | −180.00 | 19.40 | 35.03 | −6.40 | 8.71 |
| 6500 | 7.43 | 90.00 | −30.22 | −180.00 | 19.05 | 37.65 | −6.63 | 9.13 |
| 6600 | 7.43 | 90.00 | −30.61 | 177.00 | 18.91 | 38.04 | −6.82 | 9.28 |
| 6700 | 7.68 | −93.00 | −27.56 | −180.00 | 17.51 | 35.24 | −6.82 | 9.03 |
| 6800 | 7.81 | −93.00 | −27.07 | −180.00 | 17.09 | 34.88 | −6.93 | 9.34 |
| 6900 | 7.52 | 90.00 | −27.08 | −180.00 | 18.39 | 34.60 | −7.03 | 8.90 |

TABLE 4

| Layer (MHz) | Max Value (dB) | Position (deg) | Min Value (dB) | Position (deg) | Beamwidth (deg) | Max-Min (dB) | Average (dB) | Standard |
|---|---|---|---|---|---|---|---|---|
| 4900 | 5.20 | 90.00 | −29.78 | 0.00 | 28.24 | 34.98 | −5.66 | 8.56 |
| 5000 | 5.52 | 90.00 | −28.06 | 0.00 | 26.69 | 33.58 | −5.57 | 8.19 |
| 5100 | 5.86 | 87.00 | −22.38 | 0.00 | 25.02 | 28.23 | −5.37 | 7.54 |
| 5200 | 5.83 | 87.00 | −34.03 | 36.00 | 25.43 | 39.86 | −5.21 | 7.53 |
| 5300 | 5.98 | 90.00 | −25.78 | 36.00 | 24.51 | 31.76 | −5.28 | 7.20 |
| 5400 | 6.35 | 90.00 | −20.80 | 36.00 | 23.66 | 27.15 | −5.11 | 7.16 |
| 5500 | 6.75 | 90.00 | −20.04 | −174.00 | 22.53 | 26.79 | −5.09 | 7.26 |
| 5600 | 7.05 | 90.00 | −22.61 | −174.00 | 22.02 | 29.67 | −5.11 | 7.53 |
| 5700 | 7.12 | 90.00 | −22.02 | −174.00 | 21.63 | 29.13 | −5.43 | 7.58 |
| 5800 | 7.08 | 90.00 | −23.47 | 174.00 | 21.32 | 30.56 | −5.68 | 7.92 |
| 5900 | 7.14 | 90.00 | −28.26 | 54.00 | 21.32 | 35.40 | −5.92 | 8.41 |
| 6000 | 7.33 | 90.00 | −24.48 | 48.00 | 20.75 | 31.81 | −5.93 | 8.34 |
| 6100 | 7.57 | 90.00 | −25.93 | −180.00 | 19.96 | 33.51 | −5.91 | 8.58 |
| 6200 | 7.75 | 90.00 | −27.81 | −180.00 | 18.95 | 35.56 | −5.97 | 8.90 |
| 6300 | 8.06 | 90.00 | −24.51 | −180.00 | 18.14 | 32.57 | −6.00 | 8.96 |
| 6400 | 8.11 | 90.00 | −27.76 | −180.00 | 17.48 | 35.86 | −6.21 | 8.95 |
| 6500 | 8.32 | 90.00 | −30.22 | −180.00 | 16.54 | 38.54 | −6.29 | 8.79 |
| 6600 | 8.31 | 90.00 | −29.79 | −180.00 | 15.98 | 38.10 | −6.29 | 8.45 |
| 6700 | 8.42 | 90.00 | −27.56 | −180.00 | 15.55 | 35.98 | −6.24 | 8.36 |
| 6800 | 8.46 | 90.00 | −27.07 | −180.00 | 14.90 | 35.53 | −6.23 | 8.18 |

Figure 29:
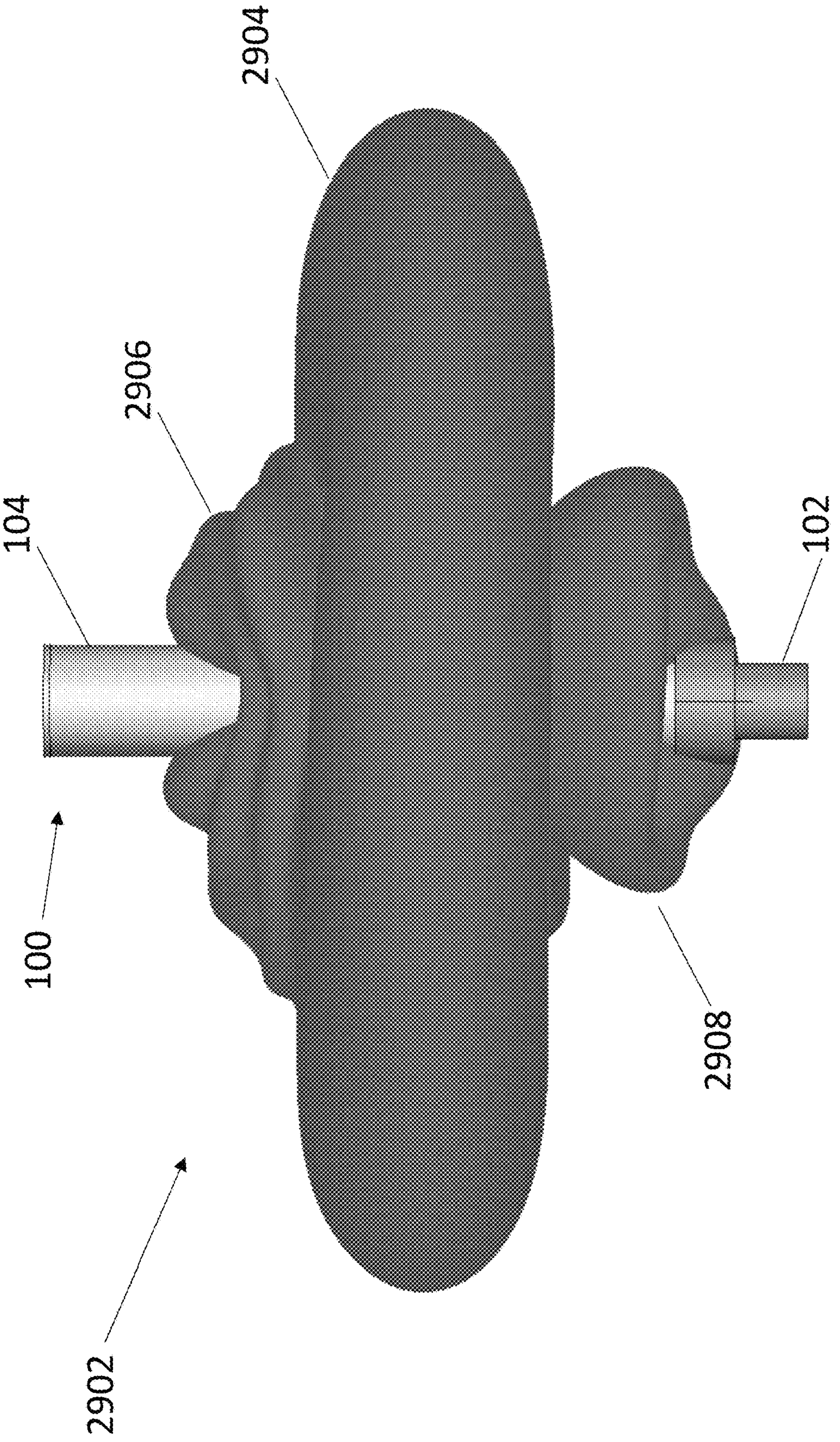
FIG. 29 is a graph of a model of a 3-dimensional radiation pattern for an antenna according to an embodiment.

FIG. 29 shows a model of a 3-dimensional radiation pattern 2902 for the antenna 100 according to an embodiment. The radiation pattern 2902 shows a main lobe 2904 at a horizontal plane, and smaller sidelobes 2906, 2908 respectively above and below 30° from the horizontal plane, which comports with the simulation and measured data as described above.

Specific embodiments of a vertically-polarized omnidirectional antenna with broadband amplitude taper according to this disclosure have been described for the purpose of illustrating the manner in which the invention can be made and used. It should be understood that the implementation of other variations and modifications of subject disclosure and its different aspects will be apparent to one skilled in the art, and that subject disclosure is not limited by the specific embodiments described. Features described in one embodiment can be implemented in other embodiments. The subject disclosure is understood to encompass this disclosure and any and all modifications, variations, or equivalents that fall within the spirit and scope of the basic underlying principles disclosed and claimed herein.

What is claimed is:

1. A vertically-polarized omnidirectional antenna, comprising:

a body comprising:

a host printed circuit board (PCB) comprising:

a first slot and a second slot; and a metal flooded ground plane;

a first antenna PCB and a second antenna PCB forming an array of four dipole pairs, each of the first antenna PCB and the second antenna PCB comprising two of the four dipole pairs, the first antenna PCB being mounted to the host PCB through the first slot, the second antenna PCB being mounted to the host PCB through the second slot;

respective first, second, and third ground connection fillet tabs, connected to the metal flooded ground plane of the host PCB and to a respective antenna PCB among the first and second antenna PCBs, at a transition between the host PCB and the respective antenna PCB, the first and second ground connection fillet tabs being on a first side of the host PCB, and the third ground connection fillet tab being on a second side of the host PCB opposite to the first side of the host PCB, the first, second, and third ground connection fillet tabs being on a same side of the respective antenna PCB;

a respective amplitude taper on each antenna PCB at the transition between the host PCB and each respective antenna PCB, each amplitude taper comprising:

a first transmission line connected to the respective antenna PCB, the first transmission line having a characteristic impedance of $Z_0-\Delta$, where $\Delta$ is between 0 and $0.2*Z_0$, the first transmission line splitting off into a second line having a characteristic impedance of $Z_0$ and a third transmission line having a characteristic impedance of at least $2*Z_0$, the second transmission line being routed toward a center of the array on the first and second antenna PCBs and feeding two antennas, each having an input impedance of $2*Z_0$, to form one dipole pair among the four dipole pairs, the third transmission line stepping into the impedance of the second transmission line using a quarter-wave transformer or a or multi-section transformer to feed a dipole pair at the edge of the array; and a radio frequency (RF) connector coupled to one end of the body to enable signal transmission and reception between the radio and antenna.

2. The antenna of claim 1, wherein the body further comprises a radome covering the two antenna PCBs and the host PCB.

3. The antenna of claim 1, wherein the third transmission line has a high characteristic impedance and comprises an 8 mil trace coated with solder mask.

4. The antenna of claim 1, wherein two center dipole pairs among the four dipole pairs receive more power than two outer dipole pairs among the four dipole pairs.

5. The antenna of claim 1, wherein the first slot and the second slot, when operated as radiators, have low input impedance at a transition between the host PCB and each respective antenna PCB.

6. The antenna of claim 1, wherein:

the metal of the host PCB reflects energy radiated by each dipole of the dipole pairs; and array radiation of each dipole pair balances radiation reflected by the host PCB to produce an omnidirectional radiation pattern.

7. The antenna of claim 1, wherein each dipole is fed with a Marchand balun.

8. The antenna of claim 1, wherein the metal flooded ground plane comprises copper.

9. The antenna of claim 1, wherein the antenna is configured to operate in a band of about 4.9-6.9 GHZ.

10. The antenna of claim 1, wherein:

the first transmission line has an impedance of about 45Ω;

the second transmission line has an impedance of about 50Ω;

the third transmission line has an impedance of about 125Ω; and each antenna in each dipole pair has an impedance of about 100Ω.

11. A method, comprising:

energizing a vertically-polarized antenna fed by a coaxial cable that is driven by a radio frequency (RF) signal;

dividing power in the RF signal among each of a plurality of dipole antenna pairs via a respective amplitude taper, each amplitude taper comprising a first transmission line connected to the respective antenna PCB, the first transmission line having a characteristic impedance of $Z_0-\Delta$, where $\Delta$ is between 0 and $0.2*Z_0$, the first transmission line splitting off into a second line having a characteristic impedance of $Z_0$ and a third transmission line having a characteristic impedance of at least $2*Z_0$, the second transmission line being routed toward a center of the array on the first and second antenna PCBs and feeding two antennas, each having an input impedance of $2*Z_0$, to form one dipole pair among the four dipole pairs, the third transmission line stepping into the impedance of the second transmission line using a quarter-wave transformer or a or multi-section transformer to feed a dipole pair at the edge of the array; and generating a highly omnidirectional RF radiation pattern having <−15 dB sidelobe level at all points in space ≥30° above a horizon over an operational frequency bandwidth.

12. The method of claim 11, wherein the third transmission line has a high characteristic impedance and comprises an 8 mil trace coated with solder mask.

13. The method of claim 11, wherein two center dipole pairs among the plurality of dipole pairs receive more power than two outer dipole pairs among the plurality of dipole pairs.

14. The method of claim 11, wherein:

the metal of a host PCB, into which each antenna PCB is inserted, reflects energy radiated by each dipole of the dipole pairs; and array radiation of each dipole pair balances radiation reflected by the host PCB to produce an omnidirectional radiation pattern.

15. The method of claim 14, wherein a transition location between the host PCB and each antenna PCB has low input impedance.

16. The method of claim 11, wherein each dipole is fed with a Marchand balun.

17. The method of claim 11, wherein the antenna operates in a band of about 4.9-6.9 GHZ.

18. The method of claim 17, wherein the radiation is suppressed in both ≥30° skyward regions to ≤−15 dB below the peak gain of the antenna.

19. The method of claim 11, wherein:

the first transmission line has an impedance of about 45Ω;

the second transmission line has an impedance of about 50Ω;

the third transmission line has an impedance of about 125Ω; and each antenna in each dipole pair has an impedance of about 100Ω.

* * * * *